United States Patent
Martin et al.

(10) Patent No.: US 10,663,321 B1
(45) Date of Patent: May 26, 2020

(54) CAPACITIVE DOOR SENSOR

(71) Applicant: Alarm.com Incorporated, Tysons, VA (US)

(72) Inventors: Jean-Paul Martin, Oakton, VA (US); Adam T. Barth, Annandale, VA (US)

(73) Assignee: Alarm.com Incorporated, Tysons, VA (US)

( * ) Notice: Subject to any disclaimer, the term of this patent is extended or adjusted under 35 U.S.C. 154(b) by 116 days.

(21) Appl. No.: 15/883,914

(22) Filed: Jan. 30, 2018

Related U.S. Application Data

(60) Provisional application No. 62/452,644, filed on Jan. 31, 2017, provisional application No. 62/520,877, filed on Jun. 16, 2017.

(51) Int. Cl.
*G01D 5/24* (2006.01)
*E06B 7/28* (2006.01)
*E05D 11/00* (2006.01)

(52) U.S. Cl.
CPC ........... *G01D 5/2405* (2013.01); *E05D 11/00* (2013.01); *E06B 7/28* (2013.01); *E05Y 2900/132* (2013.01)

(58) Field of Classification Search
CPC ......... G01D 5/2405; E05D 11/00; E06B 7/28; E05Y 2900/132
USPC ................................ 324/663, 658, 649, 600
See application file for complete search history.

(56) References Cited

U.S. PATENT DOCUMENTS

| | | | |
|---|---|---|---|
| 4,063,389 A | | 12/1977 | Leder |
| 4,072,200 A | * | 2/1978 | Morris ...................... E21B 7/04 175/45 |
| 4,933,640 A | * | 6/1990 | Kuckes ............. E21B 47/02216 166/66.5 |
| 5,570,917 A | | 11/1996 | Cutrer |
| 6,448,894 B1 | | 9/2002 | Desai |
| 2002/0062992 A1 | * | 5/2002 | Fredericks .............. E21B 47/00 175/40 |
| 2005/0128068 A1 | | 6/2005 | Winick et al. |
| 2006/0109966 A1 | | 5/2006 | Sasakura et al. |
| 2008/0134299 A1 | | 6/2008 | Posamentier |
| 2012/0008751 A1 | | 1/2012 | Forbes |
| 2013/0207773 A1 | | 8/2013 | Hathaway et al. |
| 2015/0323592 A1 | * | 11/2015 | Zhao .................. G01R 31/2889 324/756.05 |
| 2015/0357216 A1 | * | 12/2015 | Chen ................. H01L 21/67271 209/577 |
| 2017/0115141 A1 | * | 4/2017 | Kurahashi ............. G01D 13/02 |

FOREIGN PATENT DOCUMENTS

| | | |
|---|---|---|
| EP | 0803632 | 11/2003 |
| WO | 2016/093676 | 6/1916 |

* cited by examiner

*Primary Examiner* — Giovanni Astacio-Oquendo
(74) *Attorney, Agent, or Firm* — Fish & Richardson P.C.

(57) ABSTRACT

A capacitive door sensor includes an insulating plate that is located on a first leaf of a hinge that includes the first leaf and a second leaf. The capacitive door sensor further includes a first conductive plate that is located on the insulating plate. The capacitive door sensor further includes a second conductive plate that is located on the insulating plate and that is separate and spaced apart from the first conductive plate. The capacitive door sensor further includes a capacitance sensor that is electrically connected to the first conductive plate, that is electrically connected to the second conductive plate, and that is configured to detect a change in capacitance between the first conductive plate and the second conductive plate.

20 Claims, 8 Drawing Sheets

CAPACITIVE DOOR SENSOR

CROSS-REFERENCE TO RELATED APPLICATIONS

This application claims the benefit of U.S. Application 62/452,644, filed Jan. 31, 2017 and U.S. Application 62/520,877, filed Jun. 16, 2017. The contents of both are incorporated by reference.

TECHNICAL FIELD

This disclosure relates generally to capacitive sensing technology.

BACKGROUND

Contact sensors for objects such as doors or windows detect whether the objects have been opened or closed. In some examples, this information is integrated with a monitoring system in a security context.

SUMMARY

Techniques are described for capacitive sensing technology. For example, techniques are described for determining whether a door has been opened or closed. In this example, techniques may include using a capacitive sensor with monitoring and/or security systems.

In general, an innovative aspect of the subject matter described in this specification may be implemented in a capacitive door sensor that includes an insulating plate that is located on a first leaf of a hinge that includes the first leaf and a second leaf, a first conductive plate that is located on the insulating plate, a second conductive plate that is located on the insulating plate and that is separate and spaced apart from the first conductive plate, a capacitance sensor that is electrically connected to the first conductive plate, that is electrically connected to the second conductive plate, and that is configured to detect a change in capacitance between the first conductive plate and the second conductive plate.

These and other implementations can each optionally include one or more of the following features. The first conductive plate and the second conductive plate are electrically isolated. The hinge is attached to a door. The capacitance between the first conductive plate and the second conductive plate based on the door being closed is greater than the capacitance between the first conductive plate and the second conductive plate based on the door being open. The first conductive plate and the second conductive plate are electrically isolated from the second leaf of the hinge based on the door being closed. The first conductive plate and the second conductive plate are electrically isolated from the first leaf of the hinge. A capacitance between the first conductive plate and the first leaf of the hinge is constant. A capacitance between the second conductive plate and the first leaf of the hinge is constant.

The capacitance sensor includes a third conductive plate and a fourth conductive plate that are in a first plane, and a fifth conductive plate and a sixth conductive plate that are in a second plane that is parallel to the first plane. The first conductive plate is electrically connected to the third conductive plate. The second conductive plate is electrically connected to the fourth conductive plate. The capacitance sensor is configured to detect a change in capacitance between the first conductive plate and the second conductive plate by detecting a change in capacitance between third conductive plate and the fifth conductive plate and a change in capacitance between the fourth conductive plate and the sixth conductive plate. The third conductive plate, the fourth conductive plate, the fifth conductive plate, and the sixth conductive plate are electrically isolated. The first conductive plate and the second conductive plate are located in a same plane. The second leaf of the hinge is conductive.

In general, another innovative aspect of the subject matter described in this specification may be implemented in a method that includes the actions of generating, by a capacitive door sensor that includes a coplanar capacitor on a conductive door hinge, a varying electrical signal; applying the varying electrical signal to a circuit that includes the coplanar capacitor; during application of the varying electrical signal to the circuit that includes the coplanar capacitor, measuring a voltage across the coplanar capacitor; based on the voltage across the coplanar capacitor and on the varying electrical signal, determining a capacitance of the coplanar capacitor; and based on the capacitance of the coplanar capacitor, determining whether a door that is attached to the conductive door hinge is open or closed.

These and other implementations can each optionally include one or more of the following features. The actions further include comparing the capacitance of the coplanar capacitor to predetermined capacitance ranges; and based on comparing the capacitance of the coplanar capacitor to the predetermined capacitance ranges, determining that the capacitance of the coplanar capacitor is within a particular capacitance range of the predetermined capacitance ranges. The action of determining whether the door that is attached to the conductive door hinge is open or closed is based further on determining that the capacitance of the coplanar capacitor is within the particular capacitance range of the predetermined capacitance ranges. The action of generating, by the capacitive door sensor that includes a coplanar capacitor on the conductive door hinge, the varying electrical signal includes generating, by the capacitive door sensor that includes a coplanar capacitor on the conductive door hinge, the varying electrical signal for a predetermined period of time.

The action of determining a capacitance of the coplanar capacitor is based further on the predetermined period of time. The actions further include comparing the capacitance of the coplanar capacitor to predetermined capacitance ranges that each correspond to an angle of openness of the door; based on comparing the capacitance of the coplanar capacitor to the predetermined capacitance ranges, determining that the capacitance of the coplanar capacitor is within a particular capacitance range of the predetermined capacitance ranges, the particular capacitance range corresponding to a particular angle of openness of the door; and based on determining that the capacitance of the coplanar capacitor is within the particular capacitance range that corresponds to a particular angle of openness of the door, determining that an angle of openness of the door is the particular angle of openness. The actions further include based on determining that an angle of openness of the door is the particular angle of openness, performing, by the monitoring system that is connected to the capacitive door sensor, an action that corresponds to the angle of openness of the door. The circuit that includes the capacitive door sensor includes a resistor.

The actions further include during application of the varying electrical signal to the circuit that includes the coplanar capacitor, measuring the voltage across the resistor, and determining the capacitance of the coplanar capacitor is based further on the voltage across the resistor. The action of generating, by the capacitive door sensor that includes a coplanar capacitor on the conductive door hinge, the varying electrical signal includes generating, by the capacitive door sensor that includes a coplanar capacitor on the conductive door hinge, the varying electrical signal for a predetermined period of time and a predetermined number of cycles. The action of measuring the voltage across the coplanar capacitor includes determining a number of cycles of the voltage across the coplanar capacitor. The action of determining the capacitance of the coplanar capacitor is based further on the number of cycles of the voltage across the coplanar capacitor, the predetermined period of time, and the predetermined number of cycles.

The actions further include comparing the capacitance of the coplanar capacitor to a predetermined capacitance; and based on comparing the capacitance to the coplanar capacitor to the predetermined capacitance, determining that the capacitance of the coplanar capacitor is equal to the predetermined capacitance. The action of determining whether the door that is attached to the conductive door hinge is open or closed includes determining that the door that is attached to the conductive door hinge is open based on determining that the capacitance of the coplanar capacitor is equal to the predetermined capacitance. The actions of further include comparing the capacitance of the coplanar capacitor to a predetermined capacitance; and based on comparing the capacitance to the coplanar capacitor to the predetermined capacitance, determining that the capacitance of the coplanar capacitor is not equal to the predetermined capacitance. The action of determining whether the door that is attached to the conductive door hinge is open or closed includes determining that the door that is attached to the conductive door hinge is closed based on determining that the capacitance of the coplanar capacitor is not equal to the predetermined capacitance.

Implementations of the described techniques may include hardware, a method or process implemented at least partially in hardware, or a computer-readable storage medium encoded with executable instructions that, when executed by a processor, perform operations.

The details of one or more implementations are set forth in the accompanying drawings and the description below. Other features will be apparent from the description and drawings, and from the claims.

DETAILED DESCRIPTION

Techniques are described for determining the state of a door based on capacitive measurements. For example, insulated electrodes placed on a thin substrate may be placed inside of a door hinge on one side, and calculations of capacitance across the electrodes based on the location of the metal of the other side of the door hinge may be computed. The changes in these measurements may be used to determine the state of the door.

In general, contact sensors used in a security context for doors or windows use a magnet and reed switch. Magnet and reed switches are operated by applying a magnetic field to the contacts of the switch. In some examples, one contact of the magnet and reed switch is placed on the frame of the door or window, and one contact of the switch is placed on the door or window itself. These contact sensors determine whether the door or window with which it is associated has been opened or closed. However, the person installing the switch must ensure that the magnet and the reed switch are installed in the correct orientation, the correct distance apart. Many swinging doors have large moldings, necessitating explicit, detailed installation instructions for magnet and reed switches that must be followed precisely in order for the switches to effectively function. This setup process may be difficult and time consuming, especially for an untrained user.

The techniques described reduce the difficulties associated with installation of contact sensors for doors, windows, and other objects, by requiring only a single device to be placed on a single surface. For example, a user may install the capacitive sensor system by simply placing a pair of insulated electrodes in a thin substrate on the inside of a door hinge and connecting the electrodes to a sensor. In many magnet and reed switch systems, the magnet used needs to be powerful, and therefore heavy, in order to activate the reed switch. In some implementations, a heavy magnet will require fasteners to couple to a door frame or door, as adhesives generally fail, causing false alarms or leaving a property temporarily unsecured. Additionally, the placement of the electrodes increases the system's resistance to tampering and environmental conditions. Furthermore, the system is more tolerant of variations between doors, as the hinge of a door generally operates in the same way regardless of the dimensions of the door. The system may require no calibration if used to determine whether a door is open, and little calibration if used to determine a level of openness of the door.

Figure 1:
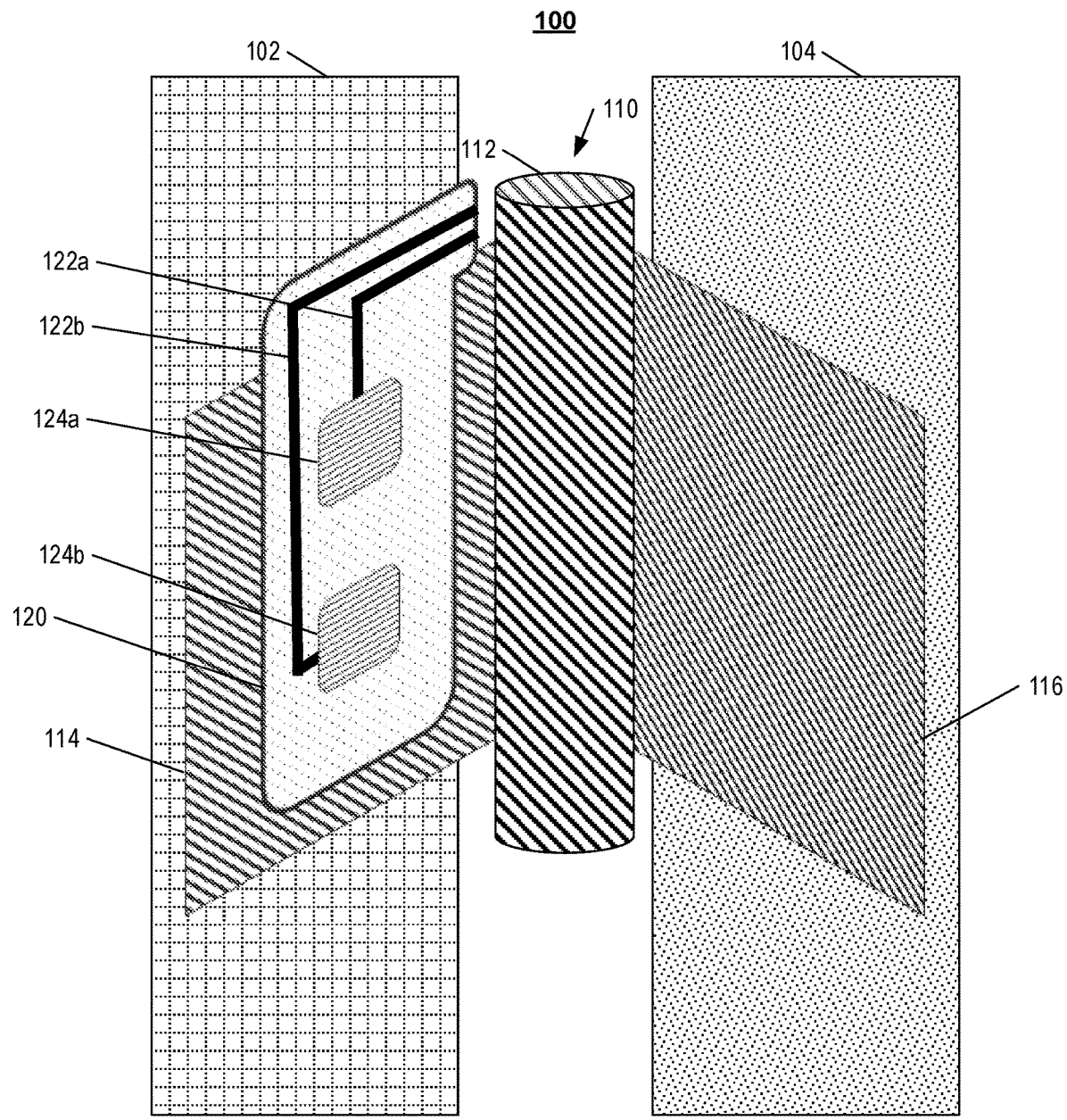
FIG. 1 illustrates an example setup of a capacitive sensing system for determining the state of a door.

FIG. 1 illustrates an example setup of a capacitive sensing system 100 for determining the state of a door. The system 100 includes a door 102, a frame 104, a hinge 110, a substrate 120, leads 122a and 122b, and insulated electrodes 124a and 124b.

The door 102 may be any type of door, including a front door of a house, a door to an interior room, a cabinet door, a vault door, etc. In some examples, the door 102 is a front door of a house, and the system 100 is used to determine whether the door 102 has been opened. For example, the system 100 may alert a user when the front door 102 of their home has been opened while the user is determined to be away from their home. The door 102 may be made of various materials, including wood, metal, composites, etc. In some examples, the door 102 is made of a non-conducting material, such as wood.

The frame 104 may be a portion of a larger structure, such as a house, an office building, a container, etc. to which the door 102 is secured. In some examples, the frame 104 is load bearing, and the weight of the door 102 is transferred to the frame 104 through the hinge 110. In some examples, the frame 104 is not load bearing. For example, the frame 104 may be a decorative frame, such as a crown molding, and may not be load bearing. The frame 104 may be constructed of various materials, including wood, metal, composites, etc.

In some examples, the frame 104 is made of the same material as the door 102. In some examples, the frame 104 is made of a different material as the door 102. For example, the door 102 may be made of wood while the frame 104 is made of metal.

The hinge 110 includes a center joint 112, a first side, or leaf, of the hinge 114, and an opposite side, or leaf, of the hinge 116. In some examples, the hinge 110 may be coupled to various different objects, such as a window, a cabinet door, etc. For example, the door 102 may be a different object which rotates about an axis, such as a gate.

The first side of the hinge 114 is a side of the hinge 110 to which the substrate 120 and the electrodes 124 are attached. The opposite side of the hinge 116 is a side of the hinge 110 opposite to the substrate 120 and the electrodes 124. The center joint, or knuckle, 112 couples the sides of the hinge 114 and 116 together, and acts as an axis of rotation for the sides of the hinge 114 and 116.

The substrate 120 is a substance onto which another substance, such as the electrodes 124 is applied. The substrate 120 may be an insulator, such as plastic, glass, rubber, porcelain, silicon dioxide, etc. In such cases, the substrate 120 separates the electrodes 124 and prevents the electrodes 124 from shorting with each other and with the hinge 114.

In some examples in which placement inside the hinge 110 is undesirable, the hinge 110 is constructed of non-conductive material, or a hinge is not present (e.g., a sliding door or window), another material can be placed on the frame 104 of the door 102 or window to create a similar capacitive relationship between the door or window and the frame the open and closed states. When the opposite side 116 is made of a conductive material, the distance between the electrodes 124 and the opposite side 116 produces a change in the capacitance between the electrodes 124 and the opposite side 116. In some examples, however, the opposite side 116 is not present or is made from a non-conducting material. In such examples, a conductive material can be applied to the stationary frame 104 or to the opposite side 116 so that a change in distance produces a change in capacitance. This change is used to determine a level of openness of a door to which the hinge 110 is attached.

The leads 122 are connections that connect the electrodes 124 to a sensor system. The leads can be any of various types of electrical connections, including wires, solder, printed circuit board (PCB) connections, etc. In some examples, the leads 122 connect the electrodes 124 to various sensing or measurement systems. For example, the lead 122a can be connected to the electrode 124a and the lead 122b can be connected to the electrode 124b, and both leads can separately be connected to a sensor. In such examples, the leads 122 may allow the sensor to apply a voltage to a capacitor, and may allow the sensor to determine a voltage of the capacitor when not applying a voltage to the capacitor.

The electrodes 124 are conductors. The electrodes 124 may be connected to other systems, such as a sensing or measuring system by the leads 122. The electrodes 124 may be constructed of any conducting material, including metals, electrolytes, superconductors, semiconductors, etc. While FIGS. 1-2C illustrate two electrodes 124, there may be more or fewer electrodes 124 in other configurations. In some examples, the electrodes 124 are encased in the substrate 120, and the substrate 120 may be plastic, or made of various non-conducting materials. In some examples, the electrodes 124 are not encased in the substrate 120, and may be placed on the substrate 120 or otherwise coupled to the substrate 120. In such examples, the electrodes 124 are insulated by being placed in a non-conducting material. In some examples, the pair of electrodes 124 are placed in the substrate 120, which is placed inside of the hinge 110 of the door 102, such that the electrodes 124 are both on the same side of the hinge 110 (e.g., the first side 114).

In some examples, the object to which the electrodes are attached may translate along an axis instead of rotating about an axis. For example, the electrodes may be attached to a sliding door or a window, and the electrodes may be attached to either the moving object or the stationary frame. In such examples, the hinge 110 may be separated into sides 114 and 116 that are not coupled to each other. In such examples, the hinge 110 may not be a hinge, and may instead be the combination of a piece of material on the moving object and a conducting material on the stationary frame of the object. For example, the first side 114 may be a bottom surface of a window 102, while the opposite side 116 may be the bottom of the frame 104 of the window 102, and the substrate 120 and the electrodes 124 may be attached to the first side 114 while a piece of conductive material is attached to the opposite side 116. In some implementations, conductive pads of the same shape as pads placed on the first side 114 and linked together with a conductive strip may be placed on the opposite side 116. The conductive pads may form a dumbbell or dog bone shape.

Figure 2A:
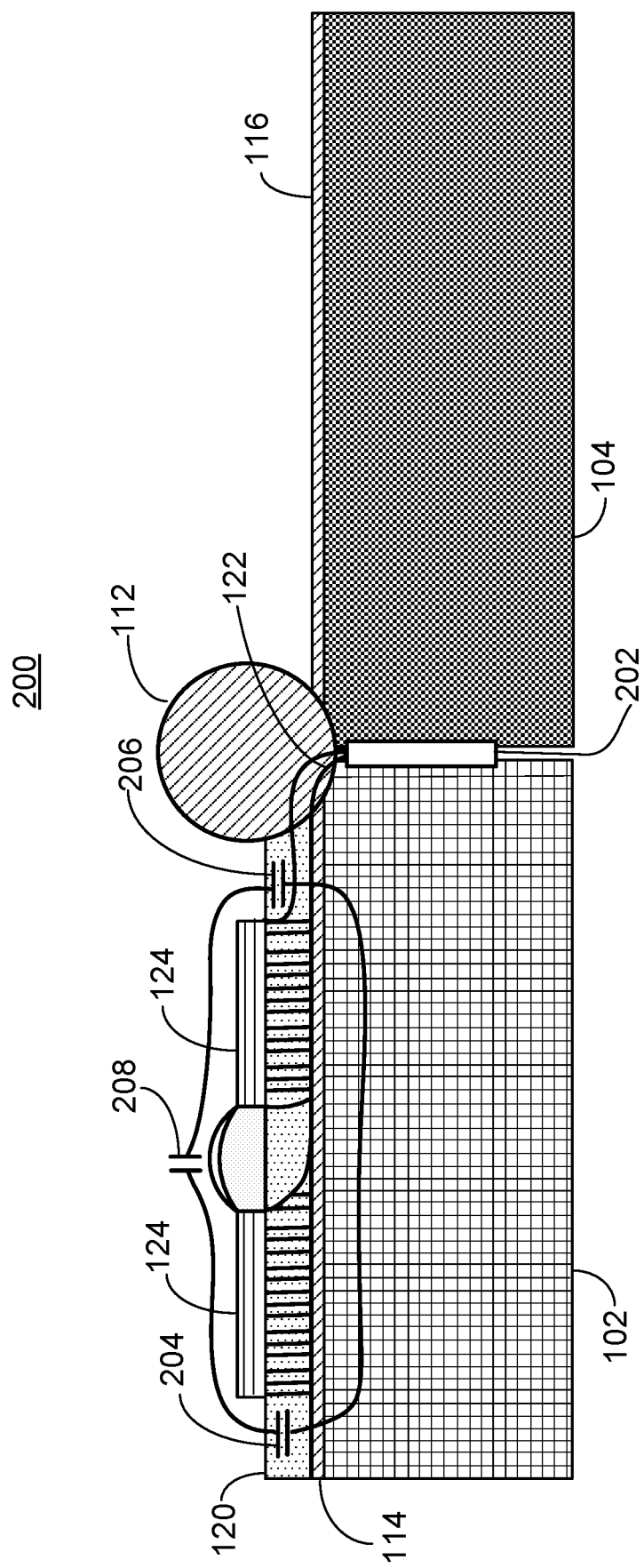
FIGS. 2A-2C illustrate example configurations of a capacitive sensing system for determining the state of a door.

FIG. 2A illustrates an example configuration 200 of a capacitive sensing system for determining the state of a door. The configuration 200 shows a capacitive sensor 202 coupled to the system 100. In some examples, the capacitive sensor 202 is coupled to the leads 122 and senses the voltage across the electrodes 124 to calculate the total capacitance of the capacitance of the electrodes 124 with the first side 114 and the opposite side 116 of the hinge 110.

Although the electrodes 124 are shown at different distances from the axis of rotation of the hinge 110, the electrodes 124 may be placed in different configurations. For example, the electrodes 124 may be placed at the same distance from the axis of rotation of the hinge 110. In some examples, the electrodes 124 may be placed in the same plane with respect to each other, and the plane may be aligned parallel with the first side of the hinge 114 and separated from the first side of the hinge 114 by the thickness of the substrate 120. In the particular configurations shown in FIGS. 2A-C, the electrodes 124 are placed in the same plane with respect to the first side of hinge 112, but are placed at different distances from the center joint 112. In some examples involving non-traditional hinges and alternative configurations of the electrodes 124, the electrodes 124 may be placed in different planes with respect to the first side of the hinge 114.

As shown in configuration 200, three effective capacitors 204, 206, and 208 represent the capacitors formed between the electrodes 124 and the hinge 114 and 116. These effective capacitors represent the capacitance between various components of the system 100 in the configuration 200 when the door 102 is open. Capacitance is the ability of an object to store an electric charge. Capacitance can be calculated as a function of voltage and charge.

The effective capacitances 204 and 206 represent the capacitance between the first side 114 and the electrodes 124. As shown in the configuration 200, there is an electric field between the electrodes 124 and the first side 114, and this field is represented by the field lines as illustrated in the configuration 200. An electric field is present within the space between two conductors, and represents the potential energy of free electrons that are moved when a voltage is applied across the electrodes 124. The electric field between the electrodes 124 and portions of the hinge 110 changes as the voltage and capacitance between the electrodes 124 change.

The effective capacitance 208 represents the capacitance between the electrodes 124. There is an electric field between the electrodes 124, and this field is represented by the field lines between the electrodes 124 as illustrated in the configuration 200.

As represented in configuration 200, the door is open. The majority of the capacitance between the electrodes 124 is represented by capacitors 204 and 206. The capacitor 208 represents a negligible capacitance. For example, the capacitance between electrodes 124 may be two microfarads. In this instance, the capacitors 204 and 206 may each be one microfarad, and the capacitor 208 may be one nanofarad, which is negligible.

Figure 2B:
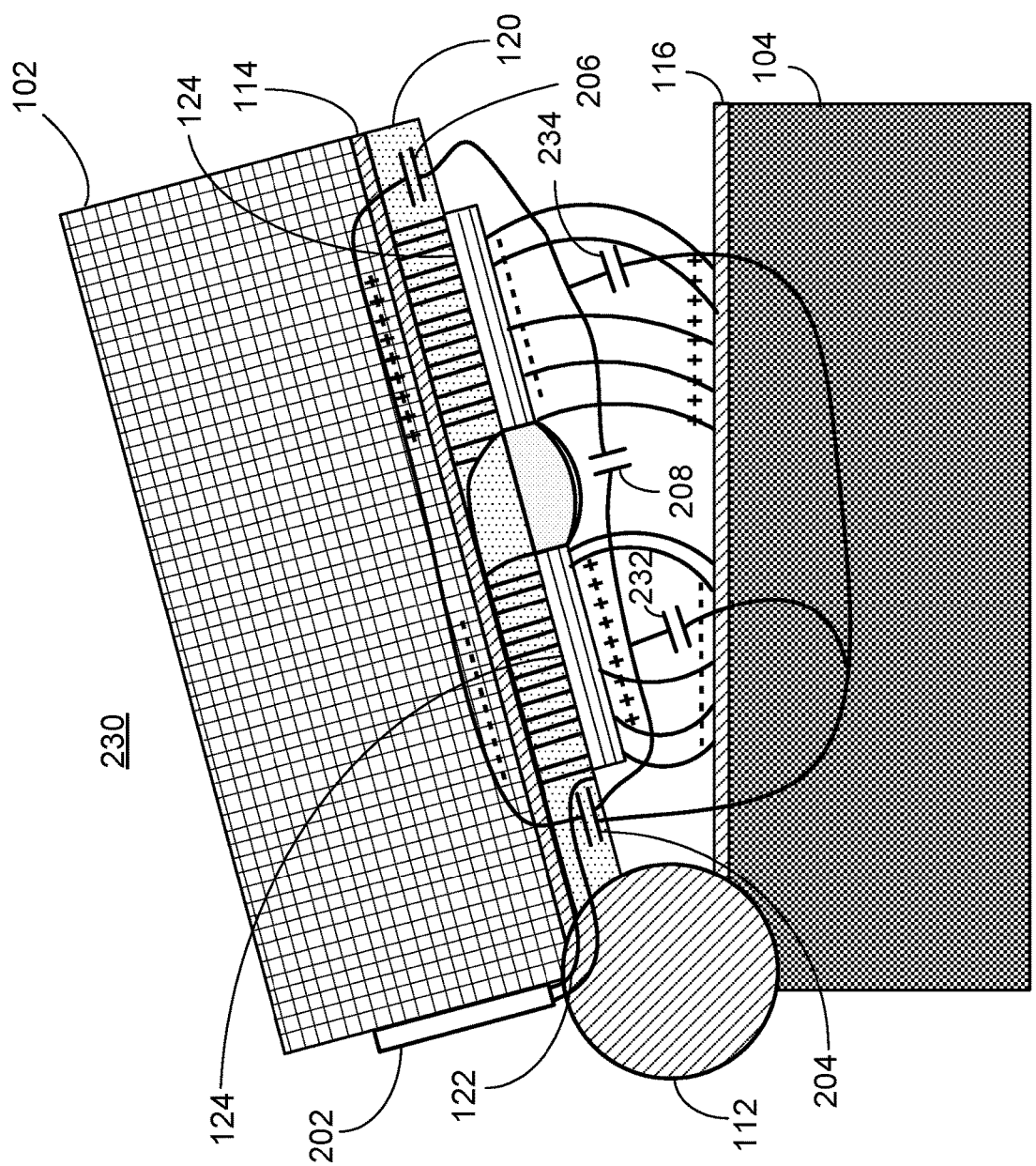
Figure 2C:
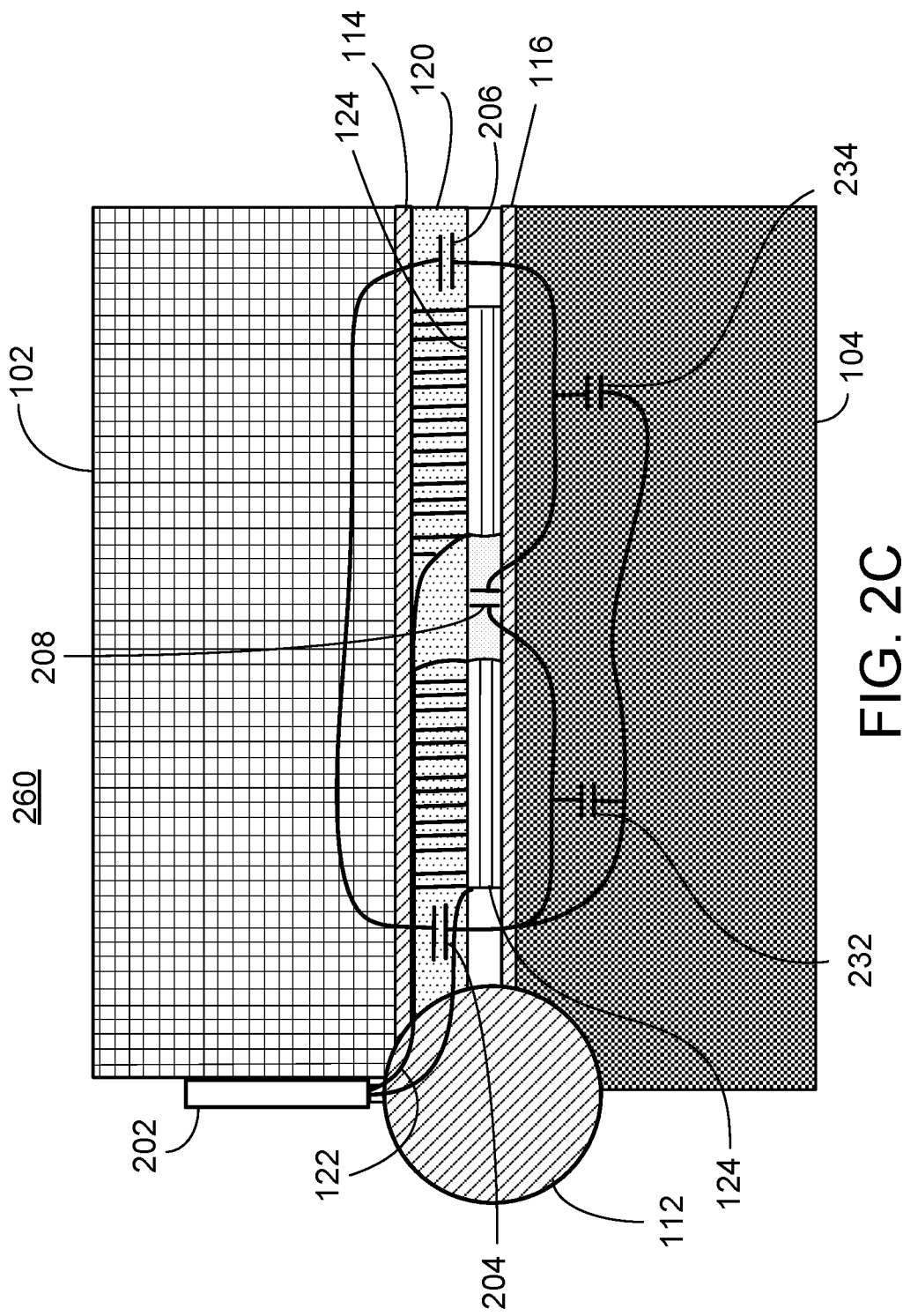

FIG. 2B illustrates an example configuration 230 of a capacitive sensing system for determining the state of a door. In the configuration 230, the door 102 is partially open.

As shown in configuration 230, five effective capacitors 204, 206, 208, 232, and 234 represent the capacitance between electrodes 124. These effective capacitors represent the capacitance between various components of the system 100 in the configuration 230 when the door 102 is partially open.

In configuration 230, the charge stored in the electrodes 124 and the first side of the hinge 114 and the opposite side of the hinge 116 during a particular instance of sensing an open level of the door 102 is represented by plus and minus signs. The minus signs represent collections of electrons. The plus signs represent an absence of electrons, or holes. In configuration 230, one of the electrodes 124 stores a collection of electrons. Because of the collection of electrons on one of the electrodes 124, the first side 114 that is opposite to the electrode 124 having the collection of electrons stores a collection of holes that are attracted to the electrons. Similarly, the opposite side of hinge 116 stores a collection of holes that are also attracted to the electrons. Because the opposite side of the hinge 116 is farther from the electrode 124 than the first side of the hinge 114, the density of holes that collect in the opposite side 116 may be less than the density of holes that collect in first side 114. The other electrode 124 stores a collection of holes. An opposite side of hinge 114 and 116 may store a collection of electrons. The configuration 230 includes the corresponding electric field lines with denser field lines representing a stronger electric field than less dense field lines.

In some examples, the hinge 110 is made entirely of the same material, and therefore acts as a short across the first side 114 and the opposite side 116. As shown in the configuration 230, the capacitances 204, 206, 232, and 234 share a common node that corresponds to the hinge 110.

With the door 102 partially opened, the capacitance between the electrodes 124 is greater than between the electrodes 124 when the door 102 is fully open. The capacitances of effective capacitors 204, 206, and 208 are virtually unchanged between the door 102 partially open and the door 102 fully open. The capacitance between the electrodes 124 increases because the distance between electrodes 124 and the opposite side 116 decreases. This increased capacitance is represented by new capacitors 232 and 234, which each represent the effective capacitance between the electrodes 124 and a corresponding portion of the opposite side 116.

FIG. 2C illustrates an example configuration 260 of a capacitive sensing system for determining the state of a door. In the configuration 260, the door 102 is closed.

As shown in configuration 260, the capacitance between electrodes 124 is represented by the effective capacitors 204, 206, 208, 232, and 234. These effective capacitors represent the capacitance between various components of the system 100 in the configuration 260 when the door 102 is closed.

With the door 102 closed, the capacitance between the electrodes 124 is greater than between the electrodes 124 when the door 102 is partially opened. The capacitances of effective capacitors 204, 206, and 208 are virtually unchanged between the door 102 partially open and the door closed. The capacitance between the electrodes 124 increases because the distance between electrodes 124 and the opposite side 116 decreases even further from the door 102 being partially opened to the door 102 being closed. This increased capacitance corresponds to an increase of capacitance in effective capacitors 232 and 234. The capacitance of effective capacitors 232 and 234 increases because the distance between electrodes 124 and the opposite side 116 decreases with the door 102 closed.

In instances where the hinge 110 is made of a conductor, such as metal, the effective capacitors 204, 206, 208, 232, and 234 share a common node that corresponds to the hinge 110. In instances where the hinge is non-conductive, the effective capacitances of capacitors 204 and 206 are zero. In this case, to ensure that the effective capacitors 232 and 234 are non-zero, a conductive plate is placed on hinge 116. Depending on the configuration of the conductive plate, the capacitors 234 and 232 may or may not share a common node.

Figure 3:
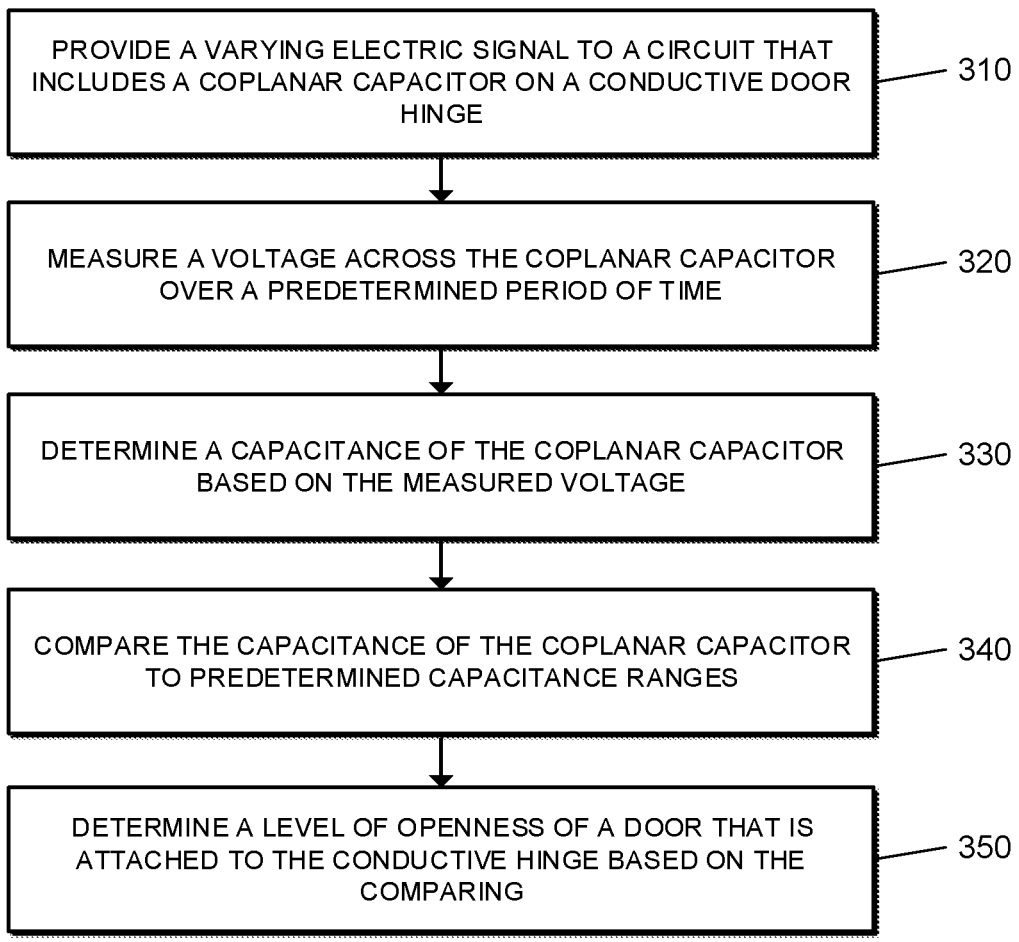
FIG. 3 is a flow chart of an example process of determining the state of a door based on capacitive measurements.

FIG. 3 illustrates an example of a process 300 of determining the state of a door based on capacitive measurements. Briefly, the process 300 may include providing, to a circuit that includes a coplanar capacitor that is located in an insulated substrate that is located on a conductive door hinge, a varying electric signal (310), measuring, over a predetermined period of time, a voltage across the coplanar capacitor (320), determining a capacitance of the coplanar capacitor based on the voltage across the coplanar capacitor during the predetermined period of time (330), comparing the capacitance of the coplanar capacitor to predetermined capacitance ranges (340), and determining a level of openness of a door that is attached to the conductive door hinge based on comparing the capacitance of the coplanar capacitor to the predetermined capacitance ranges (350). In some examples, the process 300 is performed by the capacitive sensing system 100. The system 100 may be in any of the configurations 200, 230, or 260 when the process 300 is performed.

In more detail, the process 300 includes providing, to a circuit that includes a coplanar capacitor that is located in an insulated substrate that is located on a conductive door hinge, a varying electric signal (310). The circuit may also include a resistive element such as a resistor. By including a resistor, the circuit may behave similarly to a resistor-capacitor (RC) circuit. In some examples, the door hinge is the hinge 110. In some examples, the coplanar capacitor is one or more capacitors. In some examples, the coplanar capacitor is between the electrodes 124 and the opposite hinge 116 and the first hinge 114. The varying electric signal may be a voltage that is applied across the circuit including the electrodes 124 and a resistor. This varying voltage provides energy that enables the movement of charge. In some examples, a power source is attached to the circuit including the electrodes 124 and a resistor through the leads 122. The power source may apply the varying voltage across the electrodes 124 and the resistor. In some implementations, the power source is included with the sensor.

The process 300 may include measuring, over a predetermined period of time, a voltage across the coplanar capacitor (320). The voltage across the electrodes 124 may be measured in various ways. In some examples, a voltmeter, such as the sensor 202, is coupled to the electrodes 124 through the leads 122. For example, the sensor 202 may be coupled to the leads 122 such that one lead 122 is coupled to one electrode 124 and the other lead 122 is coupled to the other electrode 124, and voltage may be measured across the electrodes 124. Alternatively or additionally, the voltage may also be measured across the resistor included in the circuit with the electrodes 124.

The process 300 may include determining a capacitance of the coplanar capacitor based on the voltage across the coplanar capacitor during the predetermined period of time (330). In some examples, the voltage across the electrodes 124 is measured and used to calculate the capacitance across the electrodes 124. This capacitance changes as the distance between opposite side 116 and the electrodes 124 changes. The capacitance can be calculated in various ways. For example, the voltage across the electrodes 124 can be measured, and then the capacitance can be calculated using the rate of change of the voltage, the value of the resistance from the RC oscillator, and the length of a known period of time. In some implementations, the capacitor may be connected to an oscillating circuit. The sensor 202 may be configured to measure a number of voltage cycles of the capacitor during a fixed amount of time where the number of voltage cycles measured is inversely proportional to the capacitance. In some implementations, the capacitance can be measured by coupling a sensor, such as a voltmeter, across the electrodes 124, measuring the charge and discharge time across the electrodes 124, measuring impedance across the electrodes and using a Nyquist plot, or using various other methods of determining a capacitance.

The process 300 may include comparing the capacitance of the coplanar capacitor to predetermined capacitance ranges (340). In some examples, the measured capacitance may be compared to a predetermined threshold value of capacitance. In some examples, the predetermined threshold value is determined by a manufacturer of the system 100. In some examples, the predetermined threshold value can be calibrated by a user. In some examples, the threshold values are threshold ranges, and the range is determined by a manufacturer of the system 100. In some examples, the threshold ranges may be calibrated or adjusted by a user of the system 100.

The process 300 may include determining a level of openness of a door that is attached to the conductive door hinge based on comparing the capacitance of the coplanar capacitor to the predetermined capacitance ranges (350). In some examples, the door may be the door 102. When the door 102 is partially open, the rate of charge and discharge across the electrodes 124 and the opposite side 116 changes depending on the distance between the electrodes 124 and the opposite side 116. When distance increases, the capacitance decreases which allows a smaller amount of charge to be stored on the electrodes 124 and respective sides of the hinge 110 compared to larger distances. This smaller amount of charge takes less time to flow to and from the electrodes 124 and respective sides of the hinge 110, and the voltage across the capacitor drops at a faster rate than with a larger capacitance. Because the voltage changes more quickly, the rate of charge and discharge increases. The total capacitance value of the circuit can be calculated by determining the change in voltage over a known period of time.

In some examples, when the hinge of a door is open, the distance between the electrodes on one side of the hinge and the metallic opposite side of the hinge is too great, and the capacitance calculated between the electrodes 124 and the opposite side 116 may be effectively, or almost, zero, especially when the electrodes are attached to a non-conductive portion of a hinge. In such examples, if the system 100 is used to determine whether the door 102 is one of two states: open or closed, a threshold difference between the initial capacitance value and the current capacitance value may be predetermined. When the capacitance is effectively zero when the door 102 is in any level of openness, little to no calibration is needed, as a range may be selected such that any difference in capacitance indicates that the door 102 is open.

In other examples, the capacitance calculated is a nonzero value when the door is open. In such examples, as described above, this nonzero capacitance is constant across all configurations of the level of openness of the door 102, and can be accounted for when determining a level of openness of the door 102. In some examples, when the hinge of the door is partially open, the capacitance calculated across the electrodes may be a nonzero value. In some examples, the capacitance measured across the electrodes 124 and the opposite side 116 when the door 102 is open may be significantly lower than the capacitance measured across the electrodes when the door is closed. In such examples, the threshold value may be a particular nonzero capacitance, and the door may be determined to be open when the measured capacitance is larger than the particular nonzero capacitance.

In some examples, the measured voltage across the electrodes 124 or the resistor is used instead of the calculated capacitance to determine a level of openness of the door 102. In such examples, the measured voltage may be compared to a threshold voltage value or a threshold range of voltage values to determine an openness of the door 102. In this instance, the voltage measurement may have to occur at a particular point of time relative to a known supply voltage.

In some implementations, a monitoring system connected to the sensor 202 may use the level of openness of the door 102, or, in other words, an angle of openness of the door 102 to identify an action to perform. For example, the monitoring system may store information related to a pet or child who lives at the property monitored by the monitoring system. The information may include the size of the pet or child and may be provided by a homeowner. The monitoring system may compare the angle of openness of the door 102, while factoring in the size of the door, to the size of the pet or child and provide a notification that the homeowner if a pet or child could escape from the door. If the angle of openness of the door 102 is too small for the pet or child, then the system may not send the notification. In some implementations, the system may consider the location of the door. The front door may trigger a notification if the angle of openness of the door 102 is large enough for a pet or child. The back door may lead to a fenced yard, and the homeowner may not be concerned about the pet or child going outside in the fenced yard. Accordingly, the back door being open wide enough for a pet or child may not trigger a notification. In some implementations, the system may use different angles of openness for a pet and for a child. The back door being open enough for a small pet, e.g., a cat, may not trigger a notification because the homeowner may not be concerned with the pet going out in the back yard. The homeowner may be concerned about a child going out in the back yard and not a pet. The homeowner may set up rules and preferences for when the monitoring system should provide notifications based on the angle of openness of different doors.

In some implementations, the monitoring system may analyze sensor data, such as that from cameras or motion sensors, near the door in response to determining that the door is open, even if slightly open, e.g., not enough for a pet or child. The monitoring system may analyze the sensor data to determine whether there are likely pets or children near the door. If the angle of the door increases while the system determines that there is likely a pet or child near the door, then the system may determine that the pet or child likely passed through the door. The system may also adjust the likelihood that the pet or child passed through the door by analyzing sensor data collected on both sides of the door, if available. The system may then provide a notification to the homeowner that the pet or child likely passed through the door. In some implementations, the type of notification may change depending on the angle of openness and other data, e.g., the weather. For example, the homeowner has indicated that the pet or child may freely go in and out of the back door, then the system may not notify the homeowner if the back door is open up to forty-five degrees. The homeowner may have also included a rule that the system should provide a notification if the door is open more than fifteen degrees and the difference between the indoor and outdoor temperature is greater than ten degrees.

In some implementations, the monitoring system may use the angle of openness of the door over a period of time to determine the speed at which the door opened or closed and the time that the door was open at each angle. For example, the monitoring system may determine that the door is opening slowly, e.g., more than five seconds to move from closed to sixty degrees. The monitoring system may provide a notification to the homeowner noting that something out of the ordinary may be occurring near the door and that the door is opening more slowly than expected. As another example, the monitoring system may determine that the door is opening quickly, e.g., less than five hundred milliseconds to move from closed to sixty degrees. The monitoring system may provide a notification to the homeowner noting that something out of the ordinary may be occurring near the door and that the door is opening more quickly than expected. The monitoring system may adjust the range, e.g., greater than five seconds or less than five hundred milliseconds, at which the monitoring system provides notice to the homeowner. The adjustment may be made in response to the homeowner's response to the notification. The homeowner may indicate that, in an instance where the door opened in six seconds, there was no issue near the door. In this case, the system may adjust the expected time range to open the door to be between five hundred milliseconds and six seconds. The system may have another range for the speed of closing the door. The range may be the same or different than the door opening range and may be adjusted in a similar fashion in response to feedback from the homeowner.

Figure 4:
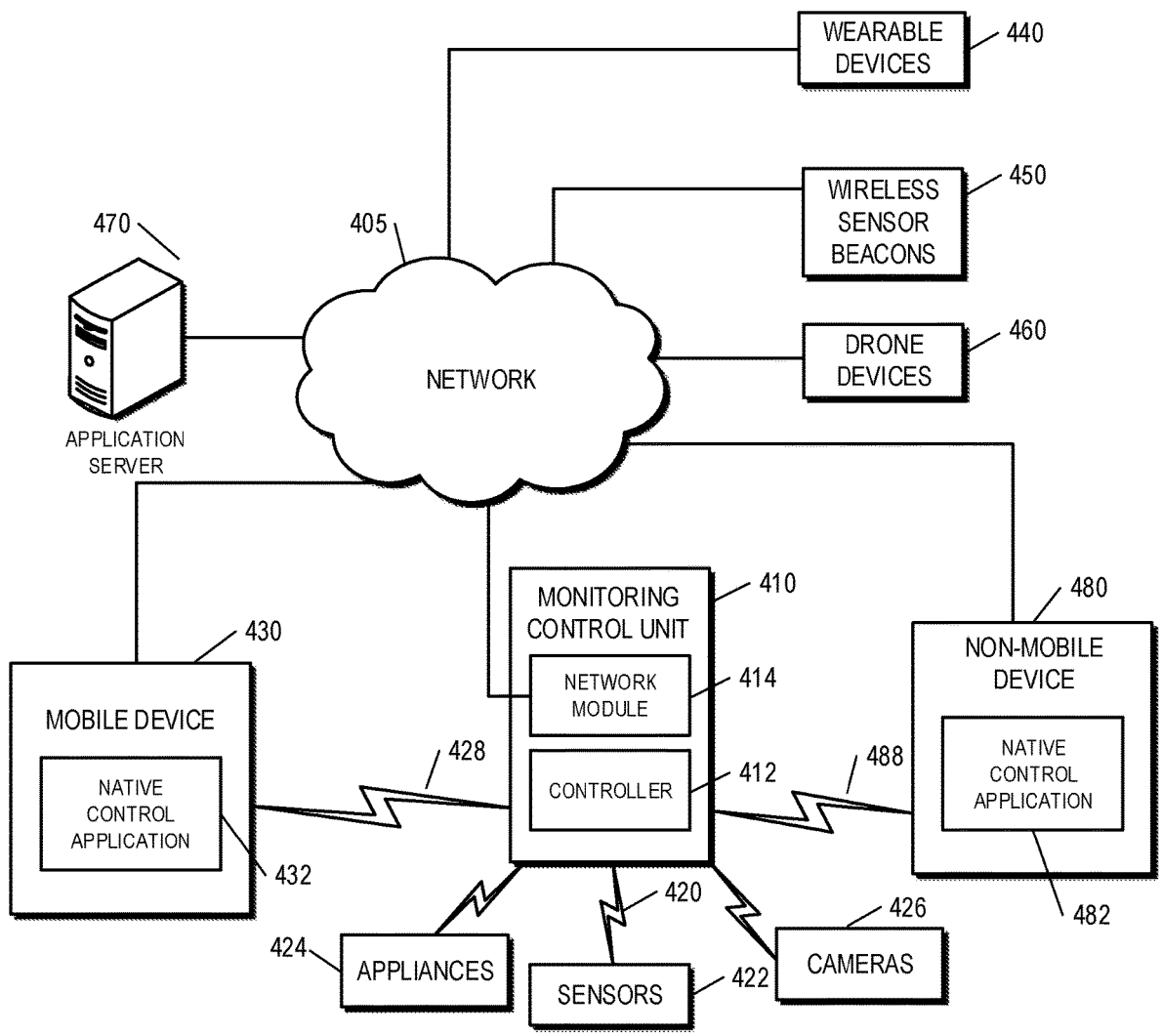
FIG. 4 illustrates an example system that uses the state of a door as input to a monitoring system.

FIG. 4 illustrates a diagram of an example of an integrated system 400. In some examples, the system 400 is integrated with the electrode and capacitive sensor system described with respect to FIG. 1. The system 400 may include a network 405, a monitoring control unit 410, one or more sensors 422, one or more appliances 424, one or more cameras 426, one or more mobile devices 430, one or more wearable devices 440, one or more beacons 450, one or more drone devices 460, an application server 470, and one or more non-mobile devices 480. The network 405 may be configured to enable electronic communications between devices connected to the network 405. For example, the network 405 may be configured to enable exchange of electronic communications between the monitoring control unit 410, the sensors 422, the appliances 424, the cameras 426, the mobile device 430, the wearable devices 440, the beacons 450, the drone devices 460, the application server 470, and the non-mobile device 480.

The network 405 is configured to enable exchange of electronic communications between devices connected to the network 405. For example, the network 405 may be configured to enable exchange of electronic communications between the monitoring control unit 410, the sensors 422, the appliances 424, the cameras 426, and the application server 470.

The network 405 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. The network 405 may include multiple networks or subnetworks, each of which may include, for example, a wired or wireless data pathway. The network 405 may also include a circuit-switched network, a packet-switched data network, or any other network able to carry electronic communications (e.g., data or voice communications). For example, the network 405 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 405 may include one or more networks that include wireless data channels and wireless voice channels. The network 405 may be a wireless network, a broadband network, or a combination of networks including a wireless network and a broadband network.

The monitoring control unit 410 may include a controller 412 and a network module 414. The controller 412 is configured to control a monitoring system (e.g., a home alarm or security system) that includes the monitoring control unit 410. In some examples, the controller 412 may include a processor or other control circuitry configured to execute instructions of a program that controls operation of an alarm system. In these examples, the controller 412 may be configured to receive input from sensors, detectors, or other devices included in the alarm system and control operations of devices included in the alarm system or other household devices (e.g., a thermostat, an appliance, lights, etc.). For example, the controller 412 may be configured to control operation of the network module included in the monitoring control unit 410.

The network module 414 is a communication device configured to exchange communications over a network 405. The network module 414 may be a wireless communication module configured to exchange wireless communications over the network 405. For example, the network module 414 may be a wireless communication device configured to exchange communications over a wireless data channel and a wireless voice channel. In this example, the network module 414 may transmit alarm data over a wireless data channel and establish a two-way voice communication session over a wireless voice channel. The wireless communication device 414 may include one or more of a LTE module, a GSM module, a radio modem, cellular transmission module, or any type of module configured to exchange communications in one of the following formats: LTE, GSM or GPRS, CDMA, EDGE or EGPRS, EV-DO or EVDO, UMTS, or a general IP format.

The network module 414 may also be a wired communication module configured to exchange communications over the network 405 using a wired connection. For instance, the network module 414 may be a modem, a network interface card, or another type of network interface device. The network module 414 may be an Ethernet network card configured to enable the monitoring control unit 410 to communicate over a local area network and/or the Internet. The network module 414 also may be a voice-band modem configured to enable the alarm panel to communicate over the telephone lines of Plain Old Telephone Systems (POTS).

In some examples, the monitoring control unit 410 may include data capture and recording devices. In these examples, the monitoring control unit 410 may include the cameras 426, one or more motion sensors, one or more microphones, one or more biometric data collection tools, one or more temperature sensors, one or more humidity sensors, one or more air flow sensors, and/or any other types of sensors that may be useful in capturing monitoring data.

The monitoring control unit 410 may be configured to communicate with the sensors 422, the appliances 424, the cameras 426, and other devices and systems of the system 400 through the network 405. In some examples, the monitoring control unit 410 may communicate with the sensors 422, the appliances 424, the cameras 426, and other devices and systems of the system 400 directly. For example, the monitoring control unit 410 may directly receive data from the sensors 422, send control signals to the appliances 424, etc. The monitoring control unit 410 may be configured to communicate with the application server 470. In some examples, the monitoring control unit 410 may be configured to communicate with the application server 470 through the network 405. In some examples, the monitoring control unit 410 may be configured to communicate with the application server 470 directly.

In some examples, the sensors 422 include the electrode and capacitive sensor system described with respect to FIG. 1. For example, data provided by the electrode and capacitive sensor system, including the determination of whether a door or window has been opened or closed can be provided to the monitoring control unit 410. The monitoring control unit 410 may provide the data provided by the system 100 to the application server 470.

Power is supplied to the sensors 422 (e.g., the system 100) through a power supply. In some examples, the power supply is a varying voltage source. In some examples, the power supply is a current source, a battery, a generator, an alternator, a solar panel, an energy cell, etc. The power supply may be connected to the system 100 through the leads 122. In some examples, the power supply may be connected to the system 100 through a separate power connection.

The monitoring control unit 410 also may include a communication module that enables the monitoring control unit 410 to communicate other devices of the system 400. The communication module may be a wireless communication module that allows the monitoring control unit 410 to communicate wirelessly. For instance, the communication module may be a Wi-Fi module that enables the monitoring control unit 410 to communicate over a local wireless network. The communication module further may be a 900 MHz wireless communication module that enables the monitoring control unit 410 to communicate directly with a different monitoring control unit. Other types of short-range wireless communication protocols, such as Bluetooth, Bluetooth LE, Z-Wave, ZigBee, etc., may be used to allow the monitoring control unit 410 to communicate with other devices in the system 400.

The monitoring control unit 410 may further include processor and storage capabilities. The monitoring control unit 410 may include any suitable processing devices that enable the monitoring control unit 410 to operate applications and perform the actions described throughout this disclosure. In addition, the monitoring control unit 410 may include solid state electronic storage that enables the monitoring control unit 410 to store applications, configuration data, collected sensor data, and/or any other type of information available to the monitoring control unit 410.

The monitoring control unit 410 may exchange communications with the sensors 422, the appliances 424, the cameras 426, and the application server 470 using multiple communication links. The multiple communication links may be a wired or wireless data pathway configured to transmit signals from the sensors 422, the appliances 424, the cameras 426, and the application server 470 to the controller 412. The sensors 422, the appliances 424, the cameras 426, and the application server 470 may continuously transmit sensed values to the controller 412, periodically transmit sensed values to the monitoring control unit 410, or transmit sensed values to the monitoring control unit 410 in response to a change in a sensed value.

The multiple communication links may include a local network. The sensors 422, the appliances 424, the cameras 426, and the application server 470 and the monitoring control unit 410 may exchange data and commands over the local network. The local network may include 802.11 "Wi-Fi" wireless Ethernet (e.g., using low-power Wi-Fi chipsets), Z-Wave, ZigBee, Bluetooth, "Homeplug" or other "Powerline" networks that operate over AC wiring, and a Category 5 (CAT5) or Category 6 (CAT6) wired Ethernet network. The local network may be a mesh network constructed based on the devices connected to the mesh network.

In some implementations, the monitoring control unit 410 may additionally be used to perform routine surveillance operations on a property. For instance, the monitoring control unit 410 may be assigned to one or more particular properties within a geographic location and may routinely collect surveillance footage during specified time periods (e.g., after dark), which may then be transmitted to the application server 470 for transmitting back to each particular property owner. In such implementations, the property owner may receive the surveillance footage over the network 405 as a part of a service provided by a security provider that operates the application server 470. For example, transmissions of the surveillance footage collected by the monitoring control unit 410 may be part of a premium security service package provided by a security provider in addition to the routine drone emergency response service.

In some implementations, the monitoring control unit 410 may monitor the operation of the electronic devices of the system 400 such as sensors 422, the appliances 424, the cameras 426, and the application server 470. For instance, the monitoring control unit 410 may enable or disable the devices of the system 400 based on a set of rules associated with energy consumption, user-specified settings, and/or other information associated with the conditions near or within the property where the system 400 is located. In some examples, the monitoring control unit 410 may be used as a replacement to a traditional security panel (or monitoring control unit) that is used to monitor and control the operations of the system 400. In other examples, the monitoring control unit 410 may coordinate monitoring operations with a separate security panel of the system 400. In such examples, the monitoring control unit 410 may monitor particular activities of the devices of the system 400 that are not monitored by the security panel, or monitor the operation of particular devices that are not monitoring by the security panel.

In some examples, a monitoring system may not be used. In these examples, the systems and devices within the system 400 (e.g., the sensors 422, the appliances 424, the cameras 426, etc.) communicate directly with the application server 470 over a long-range communication protocol.

The cameras 426 may be video/photographic cameras or other type of optical sensing devices configured to capture images. For instance, the cameras 426 may be configured to capture images of an area within a building monitored by the monitoring control unit 410. The cameras 426 may be configured to capture single, static images of the area and also video images of the area in which multiple images of the area are captured at a relatively high frequency (e.g., thirty images per second). The cameras 426 may be controlled based on commands received from the monitoring control unit 410.

The cameras 426 may be triggered by several different types of techniques. For instance, a Passive Infra Red (PIR) motion sensor may be built into the cameras 426 and used to trigger the cameras 426 to capture one or more images when motion is detected. The cameras 426 also may include a microwave motion sensor built into the camera and used to trigger the cameras 426 to capture one or more images when motion is detected. The cameras 426 may have a "normally open" or "normally closed" digital input that can trigger capture of one or more images when external sensors (e.g., the sensors 422, PIR, door/window, etc.) detect motion or other events. In some implementations, the cameras 426 receives a command to capture an image when external devices detect motion or another potential alarm event. The cameras 426 may receive the command from the controller or directly from one of the sensors 422.

In some examples, the cameras 426 trigger integrated or external illuminators (e.g., Infra Red, Z-wave controlled "white" lights, etc.) to improve image quality when the image is dark. An integrated or separate light sensor may be used to determine if illumination is desired and may result in increased image quality.

The cameras 426 may be programmed with any combination of time/day schedules, system "arming state", or other variables to determine whether images should be captured or not when triggers occur. The cameras 426 may enter a low-power mode when not capturing images. In this case, the cameras 426 may wake periodically to check for inbound messages from the controller. The cameras 426 may be powered by internal, replaceable batteries if located remotely from the monitoring control unit 410. The cameras 426 may employ a small solar cell to recharge the battery when light is available. Alternatively, the cameras 426 may be powered by the controller's 112 power supply if the cameras 426 is co-located with the controller.

In some implementations, the cameras 426 communicates directly with the application server 470 over the Internet. In these implementations, image data captured by the cameras 426 does not pass through the monitoring control unit 410 and the cameras 426 receives commands related to operation from the application server 470.

The sensors 422 may include a contact sensor, a motion sensor, a glass break sensor, or any other type of sensor included in an alarm system or security system. The sensors 422 also may include an environmental sensor, such as a temperature sensor, a water sensor, a rain sensor, a wind sensor, a light sensor, a smoke detector, a carbon monoxide detector, an air quality sensor, etc. The sensors 422 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the sensors 422 may include a radio-frequency identification (RFID) sensor that identifies a particular article that includes a pre-assigned RFID tag. The sensors 422 may include cameras, pressure sensors, temperature sensors, motion sensors, occupancy sensors, or device sensors that may communicate with the monitoring control unit 410 over the communication link 420. For example, the sensors 422 may provide the monitoring control unit 410 sensor data indicating when users leave a home, when users arrive home, what users are home, what users were doing before they left the home and an appearance of users when they leave the home.

In other implementations, the sensors 422 may include motion sensors, pressure sensors, or other sensors that determine occupancy and usage of appliances/features within a property. For example, in one instance, motion and temperature sensors may be placed on the walls within a room to determine if a person is currently occupying or not occupying the room. In another instance, the sensors 422 may be placed on particular objects and/or appliances to monitor user activity and user safety within a property. For example, touch sensors may be placed on common appliances such as, for e.g., an oven, a stove, a blender, a space heater, which may cause personal injuries to users. In some implementations, the sensors 422 within the property may collect user activity data based on proximity with the wearable devices 440 to track user movement within the property. In another example, the sensors 422 may only collect user activity data when the user is located within property based on location data transmitted from the wearable devices 440 indicating that the user is within a particular distance (e.g., 5 meters) from the sensors 422.

The one or more mobile devices 430 may be devices that host one or more native applications, e.g., the native control application 432. The mobile devices 430 may be cellular phones or non-cellular locally networked devices. The mobile devices 430 may include a cell phone, a smart phone, a tablet PC, a personal digital assistant ("PDA"), or any other portable device configured to communicate over a network. For example, implementations also may include portable music players, other communication devices, and handheld or portable electronic devices for gaming, communications, and/or data organization. The mobile devices 430 may be the same or may include mobile devices of different types. The mobile devices 430 may perform functions unrelated to the monitoring platform 400, such as placing personal telephone calls, playing music, playing video, displaying pictures, browsing the Internet, maintaining an electronic calendar, etc.

The mobile device 430 can include a native control application 432. In some examples, the native control application 432 is associated with the monitoring system associated with the system 400. The native control application 432 may be a software/firmware program configured to run on various devices that enables the user interface and features described throughout. The mobile device 430 may load or install the native control application 432 based on data received over a network (e.g., the network 405) or data received from local media. The native control application 432 runs on mobile devices platforms. The native control application 432 also enables the mobile device 430 to receive and process image and sensor data from the monitoring system.

In some implementations, the mobile device 430 communicate with and receive monitoring system data from the monitoring control unit 410 using a communication link. For instance, the mobile device 430 may communicate with the monitoring control unit 410 using various local wireless protocols such as Wi-Fi, Bluetooth, Z-Wave, ZigBee, HomePlug (Ethernet over powerline), or wired protocols such as Ethernet and USB, to connect the mobile device 430 to local security and automation equipment. The mobile device 430 may connect locally to the monitoring system and sensors 422 and other devices. The local connection may improve the speed of status and control communications because communicating through a network, such as the Internet or the network 405 with a remote server (e.g., the application server 470) may be significantly slower.

Although the mobile device 430 is shown as communicating with the application server 470, the mobile device 430 may also communicate directly with the monitoring control unit 410, the cameras 426, the sensors 422, the appliances 424, and other devices controlled by the monitoring control unit 410 when the mobile device 430 is near the property 101. For example, the mobile device 430 may exchange communications with the devices of the system 100 over the network 405.

In some implementations, the mobile device 430 receives monitoring system data captured by the monitoring control unit 410 through the network 405. The mobile device 430 may receive the data from the monitoring control unit 410 through the network 405 or the application server 470 may relay data received from the monitoring control unit 410 to the mobile device 430 through the network 405. In this regard, the application server 470 may facilitate communication between the mobile device 430 and the monitoring system.

The one or more non-mobile devices 480 may be devices that host one or more native applications, e.g., the native control application 482. The non-mobile devices 480 may be laptop computers, desktop computers, speakers, voice-activated control systems, wired telephone systems, or any other non-mobile device configured to communicate over a network. For example, implementations also may include gaming systems, other communication devices, and non-mobile electronic devices for gaming, communications, and/or data organization. The non-mobile devices 480 may be the same or may include non-mobile devices of different types. The non-mobile devices 480 may perform functions unrelated to the monitoring platform 400, such as placing personal telephone calls, playing music, playing video, displaying pictures, browsing the Internet, maintaining an electronic calendar, etc.

In some implementations, the devices 430, 480 may communicate with and receive data from the monitoring control unit 410 using the communication links 228, 288. For instance, the devices 430, 480 may communicate with the monitoring control unit 410 using various local wireless protocols, such as Wi-Fi, Bluetooth, Z-Wave, ZigBee, HomePlug (Ethernet over power line), or wired protocols such as Ethernet, USB, and other wired protocols based on the RS432, RS485, and/or RS422 standards. The devices 430, 480 may connect locally to the monitoring platform 400, its sensors, and other devices. The local connection may improve the speed of communications because communicating through the network 405 with a remote server, e.g., the application server 470, may be slower.

Although the devices 430, 480 are shown communicating with the monitoring control unit 410, the devices 430, 480 may communicate directly with the sensors 422, the appliances 424, the cameras 426, the wearable devices 440, the beacons 450, the drone devices 460, and other devices controlled by the monitoring control unit 410. In some implementations, t the devices 430, 480 may replace the monitoring control unit 410 and perform the functions of the monitoring control unit 410 for local control and long range or offsite communication.

In other implementations, the devices 430, 480 may receive data captured by the monitoring control unit 410 through the network 405. The devices 430, 480 may receive the data from the monitoring control unit 410 through the network 405 or the application server 470 and may relay data received from the monitoring control unit 410 to the devices 430, 480 through the network 405. In this regard, the application server 470 may facilitate communications between the devices 430, 480 and the monitoring control unit 410.

Although the devices 430, 480 are shown in FIG. 2 as being connected to the network 405, in some implementations, the devices 430, 480 are not connected to the network 405. In these implementations, the devices 430, 480 may communicate directly with one or more of the monitoring platform 400 components and no network connection, e.g., connection to the Internet, or reliance on remote servers is needed.

In some implementations, the devices 430, 480 may be able to determine a geographic location associated with the devices 430, 480, and may communicate information identifying a geographic location associated with the devices 430, 480 to the sensors 422 or the wearable devices 440. For example, the devices 430, 480 may determine the current geographic location of the devices 430, 480 by using global positioning system (GPS) capabilities. In other implementations, a geographic location associated with the devices 430, 480 may be determined using other methods, for example, by using Wi-Fi access point triangulation data, cellular network triangulation data, or IP address information, when the devices 430, 480 have network connectivity. The devices 430, 480 may additionally or alternatively transmit data identifying the geographic location of the devices 430, 480 over the network 405 to the application server 470, or to the monitoring control unit 410.

The devices 430, 480 may each include a native application 432, 482 respectively. The native applications 432, 482 refer to a software/firmware program running on the corresponding mobile devices that enables the safety monitoring features described within this disclosure. The devices 430, 480 may load or install the native applications 432, 482 based on data received over a network or data received from local media. The native monitoring applications 432, 482 may run on mobile devices' platforms, such as Apple iOS, iPhone, iPod touch, Blackberry, Google Android, Windows Mobile, etc.

The native applications 432, 482 identify and display user data such as, for e.g., a geographic location associated with the devices 430, 480 and communicate information identifying the geographic location to various devices within the monitoring platform 400 such the sensors 422, the wearable devices 440, or the monitoring control unit 410. In some instances, the native application 432 may also transmit user data to the application server 470. For example, the devices 430, 480 having the native applications 432, 482 may determine a geographic location of the devices 430, 480 using GPS capabilities, and may communicate data identifying the geographic location to the application server 470. In some instances, the native applications 432, 482 may check the location of the devices 430, 480 periodically and may automatically detect when a user associated with the devices 430, 480 is going toward or away from a property.

The appliances 424 may be home automation devices connected to the network 405 that are configured to exchange electronic communications with other devices of the system 400. The appliances 424 may include, for example, connected kitchen appliances, controllable light sources, safety and security devices, energy management devices, and/or other types of electronic devices capable of exchanging electronic communications over the network 405. In some examples, the appliances 424 may include kitchen appliances, such as stoves, ranges, exhaust fans, ovens, etc. In some instances, the appliances 424 may periodically transmit information and/or generated data to the monitoring control unit 410 such that the monitoring control unit 410 can automatically control the operation of the appliances 424 based on the exchanged communications. For example, the monitoring control unit 410 may operate one or more of the appliances 424 based on a fixed schedule specified by the user. In another example, the monitoring control unit 410 may enable or disable one or more of the appliances 424 based on received sensor data from the sensors 422.

The wearable devices 440 may be portable electronic devices that may be incorporated into items of clothing and accessories worn by a user. The wearable devices 440 may be activity trackers, smartwatches, smart glasses, handhelds, bracelets, necklace pendants, or any wearable device configured to communicate over a network. The wearable devices 440 may include devices of different types. The wearable devices 440 may perform functions unrelated to the monitoring platform 400, such as monitoring user activity data such as, for e.g., biometric data, fitness data, sleep data, user-inputted data, and any other type of quantitative data.

In some implementations, the wearable devices 440 may include an integrated panic button that a user may push to have the wearable devices 440 transmit a distress signal indicating that the user requires emergency assistance to the application server 470 or an emergency responder, such as a 911 dispatch center.

In some implementations, the wearable devices 440 may include embedded sensors that measure various biometric data such as, for e.g., heart rate or rhythm, breathing rate, blood oxygen level, blood pressure, skin temperature, skin moisture. In some implementations, the wearable devices 440 may include hardware components such as an accelerometer, a gyroscope, a microphone, a camera, image sensors, video sensors, sound sensors, and/or an automated speech recognizer.

The wearable devices 440 may constantly monitor and process data transmitted between the components of the monitoring platform 400 such as, e.g., the monitoring control unit 410, the sensors 422, or the mobile devices 430.

In some implementations, the wearable devices 440 may function independently of the components of the monitoring platform 400 and include a separate network module that enables the wearable devices 440 to connect to the components of the monitoring platform 400 by exchanging wireless communications over the network 405. For instance, the wearable devices 440 may include one or more GSM modules, a radio modem, a cellular transmission mode, or any type of module configured to exchange communications in the following formats: LTE, GSM or GPRS, CDMA, EDGE, EGPRS, EV-DO or EVDO, UMTS, or IP. In other instances, the wearable devices may be capable of using various local wireless protocols, such as Wi-Fi, ANT, Bluetooth, Z-Wave, ZigBee, HomePlug (Ethernet over powerline), or wired protocols such as Ethernet, USB, and other wired protocols based on the RS432, RS485, and/or RS422 standards. For example, the wearable devices 440 may transmit measured data to the mobile devices 430 over a local wireless protocol and the mobile devices 430 may then transmit the data received by the wearable devices 440 to the application server 470.

The one or more wireless sensor beacons 450 can be devices capable of emitting and/or receiving information over a wireless communication channel. For example, the wireless sensor beacons 450 may utilize Bluetooth Low Energy (BLE), also known as Bluetooth Smart, or other wireless technologies such as, for e.g., Wi-Fi, near-field communications (NFC), or other wireless technologies, to communicate with the devices connected over the network 405. The wireless sensor beacons 450 may be commercially available beacon devices or other types of beacon devices. The wireless sensor beacons 450 may communicate with the devices of the monitoring platform 205 by emitting messages (e.g., pings) that include information identifying the wireless sensor beacons 450.

In some implementations, devices of the monitoring platform 400 such as the mobile devices 430, and the wearable devices 440 may communicate with the wireless sensor beacons 450 by receiving message from the one or more wireless sensor beacons 450 identifying one or more of the wireless sensor beacons 450. For example, each of the one or more wireless sensor beacons 450 may be associated with a unique universal identifier (UUID) that identifies a particular wireless sensor beacon within a group of two or more wireless sensor beacons within a particular geographic location, for e.g., a shopping complex.

In some implementations, a particular wireless sensor beacon 250 may be associated with particular regions within a geographic location, for e.g., particular floors or individual shops within a shopping complex, to monitor user data by exchanging communications with nearby one or more mobile devices 430, 480 or wearable devices 440. For example, one or more wireless sensor beacons 450 may be placed within multiple floors of a shopping complex, each with different UUIDs and a particular set of latitude and longitude coordinates that are associated with a defined region (e.g., a section within a store, an outdoor area, a building, a venue or other space).

Each of the one or more wireless sensor beacons 450 may broadcast information to allow the devices of the monitoring platform 400 to recognize the one or more of the wireless sensor beacons 450. In some instances, the one or more wireless sensor beacons 450 broadcast their information periodically for particular periods of time (e.g., every second, every millisecond). The one or more wireless sensor beacons 450 may broadcast this information using wireless communications protocols such as, for e.g., BLE. In some implementations, information broadcasted by the one or more wireless sensor beacons 450 may also be broadcasted on particular frequencies or power levels to control the types of devices on the monitoring platform 400 that receive the information. For example, the one or more wireless sensor beacons 450 may transmit information to the mobile devices 430 and the wearable devices 440, on different frequencies, respectively.

In some implementations, the one or more wireless sensor beacons 450 may be placed in common regions that experience high user traffic volumes such as, for e.g., a public park, a tourist attraction, a public transportation station, a commercial complex, or other types of highly populated locations. In such implementations, the one or more wireless sensor beacons 450 may be configured with third-party electronic transportation or safety platforms to transmit information to the devices connected to the monitoring platform 400. For example, the one or more wireless sensor beacons 450 may detect a hazardous condition on a subway line based on receiving safety signals from the transportation authority and in response, transmit this information to the mobile devices 430 or the wearable devices 440.

In some implementations, the one or more wireless sensor beacons 450 may be configured to operate with a particular mobile application that is installed on the devices connected to the monitoring platform 400. For example, the particular mobile application may include a software development kit (SDK) that enables the devices connected to the monitoring platform to exchange communications with the one or more wireless sensor beacons 450. For instance, the different devices connected to the monitoring platform 400 may independently exchange communications with the one or more wireless sensor beacons 450. In such instances, a wearable device 440 may be able to transmit a distress signal including user data to the one or more wireless sensor beacons without the user having his/her mobile device with him. In other instances, the one or more wireless beacons 450 may receive redundant signal transmissions from the different devices connected to the monitoring platform 400 to ensure that distress signal is adequately transmitted to the application server 470 when one or more of the devices connected to the monitoring platform 400 malfunctions. For example, if a user is involved in a car crash that destroys his/her wearable device and mobile device, the monitoring platform 400 may determine that these devices are unable to transmit the distress signal and instead transmit a distress signal including cached data stored on other devices connected to the monitoring platform 400 such as the one or more wireless sensor beacon 250 or the drone devices 460.

In some implementations, the one or more wireless sensor beacons 450 may be connected to emergency call booths that enable the one or more wireless sensor beacons 450 to identify devices within a particular distance (e.g., 30 meters) when the devices transmit a distress signal to the monitoring platform 400. For example, the emergency call booths may monitor a particular frequency that includes the frequency of the outgoing distress signals transmitted by nearby devices. In response to detecting that a nearby device has transmitted a distress signal within a particular time period (e.g., 5 minutes), the particular wireless sensor beacon 250 that is connected to the emergency call may then transmit a signal including location information to the application server 470 or to an emergency responder, such as a fire department dispatch center.

The drone devices 460 may be unmanned devices that are capable of movement. For example, the drone devices 460 may be capable of moving throughout a location based on automated control technology and/or user input control provided by either the user or by the devices connected to the monitoring platform 400. In this example, the drone devices 460 may be able to fly, roll, walk, or otherwise move about a location. The drone devices 460 may include helicopter type devices (e.g., quad copters), rolling helicopter type devices (e.g., roller copter devices that can fly and also roll along the grounds, walls, or ceiling), land vehicle type devices (e.g., automated cars that drive around a property), and plane type devices (e.g., unmanned aircraft).

In some implementations, the drone devices 460 may be dispatched in response to an incident signal indicating that a user may require emergency assistance. For example, if a user has been injured during a known running route, the wearable device 440 may transmit data to the application server 470 from which the application server 470 may determine there is a likely safety incident, and in response, transmit an incident signal and a location of the user to an emergency responder and also transmit a dispatch instruction with the user location to the drone devices 460. The application server 470 may determine the location of the user during an incident based on comparing current data collected by the sensors 422, one or more mobile devices 430, 480, the wearable device 440, or the one or more wireless sensor beacons 450 to historical information about the user or user activity. In such examples, the monitoring platform 400 may deploy the drone devices 460 to the determined location. In some instances, the drone devices 460 may be equipped with a broadband connection that allows the drone devices 460 to connect with the network 405.

In some implementations, the drone devices 460 may include data capture and recording devices. In some instance, the drone devices 460 may include one or more cameras, one or more motion sensors, one or more microphones, one or more biometric collection tools, one or more temperature sensors, one or more humidity sensors, one or more airflow sensors, and/or other types of sensors that may be useful in capturing monitoring data related to user safety. For example, once dispatched to a location where the user may require emergency assistance, the drone devices 460 may capture a video feed of the user showing the extent of injury and transmit the video feed to either the application server 470 or directly to an emergency responder to alert them about the user's condition. In other examples, the drone devices 460 may be outfitted with thermal-imaging cameras capable of identifying locations, people, or pets through structural features of a location. For example, the drone devices 460 may be deployed to a property in which a user is located and may use the thermal-imaging cameras to determine a particular location within the property where the user may be trapped inside the property. In such examples, the drone devices 460 may transmit the captured thermal video footage to an emergency responder, such as a nearby fire station.

In some implementations, the drone devices 460 may also include output devices. In such implementations, the drone devices 460 may include one or more displays, one or more speakers, one or more projectors, and/or any type of output devices that allow the drone devices 460 to communicate information to nearby emergency contacts. For example, if a user is physically disabled as the result of an incident and unable to use wearable devices 440 or mobile devices, the user may record a distress message or video using the drone devices 460, which may then transmit the message or video to the application server 470.

In some implementations, the drone devices 460 may be configured to record visual verifications and/or identify perpetrator identification for particular types of incidents. For example, in response to safety incidents determined by the application server 470, the application server 470 may deploy the drone devices 460 to record video footage. In some instances, the drone devices 460 may be configured to operate within certain geographic regions (e.g., a gated residential community). The drone devices 460 may be centrally operated by a security provider such as an alarm security company providing security services to a particular geographic region. In such instances, the drone devices 460 may be stored in a central home base with a charging and control station and deployed as a mobile solution in response to an incident signal for users.

In some implementations, the drone devices 460 may be delivery drones (e.g., a parcelcopter) that may be utilized by the monitoring platform 400 to provide supplies or other equipment to a user in response to the application server 470 detecting the occurrence of an incident. For instance, the drone devices 460 that are delivery drones may be used to dispatch first aid kits and/or other emergency medical equipment (e.g., gauze, bandages, braces, epi pens, tourniquets, etc.). In such instances, the drone devices 460 may delivery particular supplies based on the classification of the incident by the application server 470.

In some implementations, after the application server 470 determines an incident, the application server 470 may select the particular drone device 460 to deploy to the incident from a set of drone devices 460 based on particular attributes such as, for e.g., charge levels, location of the incident, and the direction of user movement. For example, the set of drone devices 460 may include various drone devices 460 with varying battery capacities, aerial speeds, and/or device features. In such examples, the monitoring platform 400 may choose the particular drone device 460 to be deployed that can get to the location of the incident the fastest and has enough battery to monitor the user for a reasonable amount of time (e.g., fifteen minutes).

In some implementations, multiple drone devices from the set of drone devices 460 may be deployed based on the particular nature of the safety incident. For example, the application server 470 may deploy multiple drone devices if the received user data indicates the safety incident is a life-critical incident (e.g., a house fire) that causes a loss of life. In some instances, the multiple drone devices may be deployed sequentially to maximize response time and conserve resources. For example, the multiple drones may include a diagnostic drone device, which is deployed initially to minimize response time, and a support drone device that provide the user with emergency supplies to help with the emergency event. In another example, an initial drone device may be deployed to minimize response time while a secondary drone is deployed as a backup if the battery of the initial drone runs out.

The application server 470 is an electronic device configured to provide monitoring services by exchanging electronic communications with the monitoring control unit 410 and the mobile device 430 over a network, such as the Internet, a LAN, etc. In some examples, the network is the network 405. For example, the application server 470 may be configured to monitor events (e.g., events that are used to determine the state of a property monitored by the monitoring system associated with the system 400) generated by the monitoring control unit 410. For example, the application server 470 may determine from received sensor data whether the user is injured or in danger. To make the determination, the application server 470 may provide control services by exchanging electronic communications with the monitoring control unit 410 and the mobile devices 430 over the network 405. In this example, the application server 470 may exchange electronic communications with the network module included in the monitoring control unit 410 to receive information regarding events (e.g., alarm events) detected by the monitoring control unit 410. The application server 470 also may receive information regarding events from the mobile device 430.

In some examples, the application server 470 may be configured to monitor user data generated by the devices connected to the monitoring platform 400 such as the sensors 422, the devices 430, 480, the wearable devices 440, the one or more wireless sensor beacons 450, and the drone devices 460. In this example, the application server 470 may exchange electronic communications over the network 405 to send and/or receive information regarding user activity such as biometric data, activity data, location data and health data. The application server 470 also may receive information regarding activity within or external to the property from the devices 430, 480 or the wearable devices 440.

In some implementations, the application server 470 may route alarm data received from the network module or the mobile device 430 to a central alarm station server that is maintained by a third-party security provider. The alarm data can include captured video footage of the detected individual within a specific area of the property, which is processed by the third-party security provider to request emergency assistance to the property. For example, the alarm data can be transmitted to law enforcement to indicate a potential security breach within the property. In some instances, the alarm data can also include metadata identified by the monitoring control unit 410 within the captured video footage (e.g., gender of the individual, suspected identity of the individual, key physical attributes, etc.). In these examples, the alarm data can either be transmitted to law enforcement after requesting confirmation from the user, or automatically transmitted without intervention from the user.

The application server 470 may store sensor and image data received from the monitoring control unit 410 and perform analysis of the sensor and image data. Based on the analysis, the application server 470 may communicate with and control aspects of the monitoring control unit 410 or the mobile device 430.

In some implementations, the application server 470 may store a user profile with user data transmitted from the devices connected to the monitoring platform 400. For instance, the devices connected to the monitoring platform 400 may periodically transmit various types of user data to the application server 470. The application server 470 may aggregate the different types of user data such as personal data, biometric data, activity data, and historical data into a user profile. In some instances, the application server 470 may use the user profile to learn normal usage patterns such as activity patterns (e.g., common exercise routines) and normal biometric measurements (e.g., resting heart rate, baseline blood pressure, normal skin temperature, baseline breathing rate). For example, the application server 470 may periodically receive user data collected by the devices connected to the monitoring platform 400 such as, for e.g., the devices 430, 480, or the wearable devices 440, and log the user data into the user profile. The application server 470 may then aggregate the received user data over particular time periods (e.g., six months) and perform trend analyses to determine normal biometric measurements for the user. In another example, the application server 470 may receive user activity data (e.g., steps taken, calories burnt) and compare the activity data with location data to determine usage patterns such as exercise locations, exercise routines, and other activity patterns.

In some implementations, the application server 470 may determine incidents and generate incident reports indicating that a user requires emergency assistance. For example, an incident may be any type of safety incident that is detected by the application server 470 based on the user data collected by the devices of the monitoring platform 400. For example, the application server 470 may determine that a user may be having a heart attack based on the particular wearable device 440 that measures heart rate data that the current heart rate is too high compared to a reference measurement. In response, the application server 470 may transmit an incident report to an emergency responder, such as an ambulance dispatch center, that includes various types of user data such as, for e.g., heart rate measurements, user activity data indicating prior physical activity, historical measurements of heart rates hours prior to the incident.

In another example, the application server 470 may determine from received sensor data that a user was running along a trip route saved in a user's profile and mid-way between the route, the user's breathing pattern and heart rate corresponded to those when the user is unconscious or asleep and that the user is still moving. In response, the application server 470 may determine that there is a safety issue. For example, the application server 470 may determine from data from cameras 426 that the user may have been kidnapped. If the application server's 270 confidence that the user has been kidnapped is high, the application server 470 may immediately notify emergency personnel. If the application server's 270 confidence that the user has been kidnapped is moderate, the application server 470 may display a prompt and an audio alert on the user's mobile device, wearable device or heads up display indicating that the application server 470 has determined that the user may be in danger and how the application server 470 made the determination, and a countdown indicating that emergency personnel will be notified if the user does not verify that there is no safety issue within a specific period of time (e.g., thirty seconds). The application server 470 may require that the user enter a passcode on the user's mobile device to verify that no notification should be made.

In some instances, the application server 470 may be configured to determine particular duress codes sent by the user in the event of an emergency incident. For instance, the user may enter a pre-determined or customized duress code it appears as if the user has cancelled the alarm but actually transmits a duress signal to the application server 470. For example, the user may enter the duress code during a robbery.

In yet another example, the application server 470 may receive an indication that a user has activated a panic button on a necklace worn by the user, sensor data indicating that the user was traveling at a high speed corresponding to a car and is no longer moving, and sensor data indicating that the user's car airbags have deployed. In response, the application server 470 may determine that the user has been in a car accident and is seriously injured and may notify emergency personnel accordingly.

In some instances, the application server 470 may monitor the user location of the user when he/she is close to or inside the property to determine how to process an incident signal. For example, if the user is involved in an incident outside the property, the application server 470 may transmit the incident signal to emergency responders and if the user is involved in an incident inside the property, the application server 470 may instruct the monitoring control unit 410 to transmit the incident signal to the home security provider for the home.

In some implementations, the application server 470 may determine the occurrence of an incident based on comparing extrinsic data surrounding the user location and the user data collected by the devices connected to the monitoring platform 400. For instance, the application server 470 may monitor current weather, daylight level, air quality, and/or other external conditions to determine whether the user data indicates suspicious conditions. For example, if the current weather indicates a thunderstorm, then the application server 470 may determine that the user location indicating that the user is stationary outside may be suspicious, e.g., the user may have been struck by lightning or the user is being forced to stay stationary outside. In another example, if it is night time, the application server 470 may determine that the user is more likely to be performing night time activities, e.g., stargazing, walking, jogging as opposed to football or basketball, and determine whether there is likely to be a safety incident based on the types of night time activities in which the user might have been engaged. In yet another example, if it is night time but the user data indicates that the user is currently performing activities outside that are better suited for sunlight, e.g., football or basketball, the monitoring platform 400 may also determine that this may be suspicious. In another example, if the user medical history in the application server 470 indicates that the user may have asthma but that the user is located in an area with low air quality, the application server 470 may predict that the user may likely have an asthma attack or may determine that the user is likely suffering an asthma attack.

In some implementations, the application server 470 may aggregate user data collected by devices of multiple users that are all connected to the monitoring platform 400 to gather data surrounding mass casualty incidents. For example, if there is a large-scale emergency within a particular location (e.g., earthquake, terror attack, public evacuation, etc.), the application server 470 may determine the presence of such an emergency based on aggregating suspicious data from multiple devices within the particular location. The application server 470 may compare the aggregated data to other types of environmental data (e.g., seismic activity, electromagnetic pulses, or radiation) that are be collected from sensors located nearby or within the particular location where there may be abnormal activity.

In some implementations, the monitoring platform 400 may additionally or alternatively include various features. For example, the monitoring platform 400 may include a peer-to-peer location sharing feature that enables users to send location information collected from the mobile devices 430 or the wearable devices 440 to emergency contacts. In another example, the monitoring platform 400 may include a distress signal forwarding feature that enables a user to transmit a distress signal including user location information from either the mobile devices 430 or the wearable devices 440 to an emergency responder such as, for example, a fire station, an emergency medical services facility, or a police station. In another example, the monitoring platform 400 may include mobile applications that use the location data collected by the devices 430, 480 and the wearable devices 440 to determine the nearby authorities having jurisdiction (AHJ) or the public safety access points (PSAP) in case of an emergency incident within the user location.

The monitoring platform 400 as described within this disclosure may be adapted to function with a variety of wearable devices, communication devices, and networks with long-term extensibility. For example, new wearable devices and applications may be adapted to operate with the monitoring platform 400 by adapting the new wearable devices to run mobile applications that are capable of exchanging communications with the devices connected to the monitoring platform 400. In some instances, the monitoring platform 400 may include a mobile application ecosystem that includes customized mobile applications that are built for particular mobile devices, wearable devices, communication devices, safety sensors, drone devices, and wireless sensor beacons such that these devices may exchange communications over the network 405 with emergency responders. For instance, particular examples of wearables device may include a smart motorcycle helmet or a smart skiing helmet that can transmit speed and crash information to emergency medical responders, including the location on the helmet of the impact(s) and the number of impacts(s). In another instance, vehicles such as cars, motorcycles, and public transportation may include smart sensors that transmit distress signals to nearby emergency responders in response to a vehicular crash. In other instances, wearable devices may include miniaturized personal health devices used to monitor the movement of patients with chronic diseases such as, for e.g., Parkinson's disease.

Figure 5:
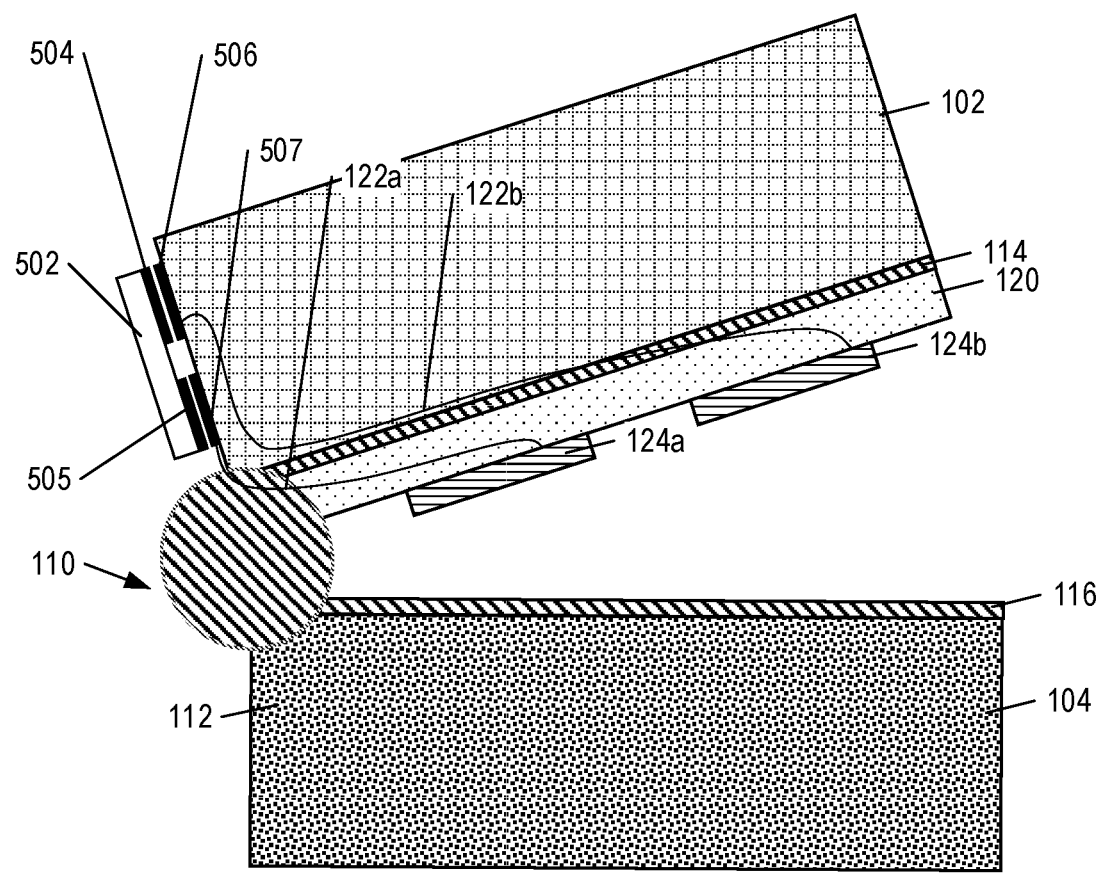
FIG. 5 illustrates an example configuration of a capacitive sensing system for determining the state of a door.

FIG. 5 illustrates an example configuration 500 of a capacitive sensing system for determining the state of a door. The configuration 500 shows a capacitive sensor 502 coupled to the system 100 as described with respect to FIG. 1. The capacitive sensor 502 senses the voltage across the electrodes 124a and 124b to calculate the total capacitance between the electrodes 124 and the first side 114 and between the electrodes 124 and the opposite side 116 of the hinge 110. For example, the capacitive sensor 502, the leads 122, and the electrodes 124 may be a single assembly that is coupled to the hinge 110, such that the leads 122 are soldered or otherwise physically attached to the capacitive sensor 502 on one end and the electrodes 124 on the other end. However, when the sensor 502 is physically coupled to the leads 122, it is possible for an installer or an end user of the system 100 to damage the system 100 by separating the electrodes from the body of the sensor 502. For example, if a technician installing the system 100 applies too much force when removing the sensor assembly from its packaging, the technician may rip the leads 122 from the sensor 502.

In some examples, the sensor 502 can have a detachable connection with the leads 122 such that the leads 122 can be removed from the sensor 502 without damaging the sensor assembly. For example, there can be a barrel jack between the sensor 502 and the leads 122. However, adding a physical connection in the sensor assembly creates a new point of failure and increases cost.

As shown in system 500, in some examples, the physical connection between the sensor 502 and the leads 122 can be replaced by a capacitive connection. The system 500 shows the addition of conductive material 504 and 505 that are capacitively coupled to conductive material 506 and 507. The conductive material 507 is connected to the lead 122a and the conductive material 506 is connected to the lead 122b. The capacitors 504 and 505 can be integral components of the body of the sensor 502 or the conductive material 504 and 505 can be a component separate from the sensor 502 that is electrically connected to the sensor 502. The conductive material 506 and 507 can be coupled to the door 102 in various ways, such as through the use of adhesive, the use of fasteners, or the use of mechanical fitments such as a press fit of the material 506 and 507 into the door 102. The conductive material 506 and 507 are each coupled to a respective electrode 124a and 124b through the leads 122.

The sensor 502 is physically coupled to the door 102 such that the conductive materials 504 and 505 are aligned with the conductive materials 506 and 507, and are a fixed distance from the conductive materials 506 and 507. For example, the conductive materials 504 and 505 can have an area that is larger than the area of the conductive materials 506 and 507, and the sensor 502 can be fitted into a bracket on the door 102 that places the conductive materials 504 and 505 a fixed distance from the conductive materials 506 and 507 such that the conductive material 504 and 505 completely cover the conductive materials 506 and 507. The sensor 502 can be coupled to the door 102 in various other ways as well, including adhesives such as insulating tape or fasteners such as screws or bolts. In some examples, the conductive materials 504 and 505 cover only a portion of the conductive materials 506 and 507. As long as there is a portion of each of the conductive materials 504 and 505 that overlap with the conductive materials 506 and 507, a change in voltage can be measured at the conductive materials 504 and 505. These changes in voltage can be used to calculate a change in capacitance. A change in capacitance can also be calculated by measuring the changes in frequency in an oscillating circuit. For example, the changes in frequency in an RC circuit that includes conductive materials 504, 505, 506 and 507, the leads 122, and the electrodes 124, can be measured and used to calculate a change in capacitance.

The sensor 502 can be a part of the circuit as described with respect to FIGS. 2A-3. For example, the sensor 502 can include a resistive element such as a resistor such that the sensor 502 may behave similarly to a resistor-capacitor (RC) circuit. The sensor 502 can apply a varying electric signal, such as a voltage, to the conductive material 504. This varying voltage provides energy that enables the movement of charge. In some examples, the sensor 502 can measure the voltage difference between various conductive materials. For example, the sensor 502 can include a resistor, a voltage source, and a voltmeter. Changes in voltage of the conductive material 504 can be measured, and are used to calculate differences in capacitance values.

The system 500 can be used to calculate the change in capacitance of the system 500 when the door 102 is opened or closed. The sensor 502 can be used to measure the voltage changes of the conductive materials 504 and 505. The capacitance changes may be caused by the electrodes 124 moving relative to the opposite side of the hinge 116. The capacitance between the electrodes 124 and the first side of the hinge 114 may be constant because the electrodes 124 do not move relative to the first side of the hinge 114 as the door opens and closes. The capacitance between the electrodes 124 and the opposite side of the hinge 116 increases as the door 102 closes because the distance between the electrodes 124 and the opposite side of the hinge 116 decreases and decreases as the door 102 opens because the distance between the electrodes 124 and the opposite side of the hinge 116 increases.

The capacitance induced between the conductive materials 504 and 506 remains constant as the distance between the electrodes 124 and the opposite side of the hinge 116 changes. Therefore, the total capacitance of the system, including the capacitance between the conductive materials 504 and 506, between the conductive materials 505 and 507, and between the electrodes 124, and the sides of the hinges 114 and 116 changes because the capacitance induced between the electrodes 124 and the opposite side of the hinge 116 changes. The sensor 502 measures voltage and then calculates the total capacitance of the system, where that total capacitance includes the capacitance induced between the conductive materials 504 and 506 and 505 and 507 ($C_1$), and the capacitance induced between the electrodes 124 and the opposite side of the hinge 116 ($C_2$). These capacitances are connected in series, and therefore the total capacitance of the system can be represented by relationship 1:

$$C_{total} = \frac{C_1 * C_2}{C_1 + C_2}. \tag{1}$$

As shown in relationship 1, even though $C_1$ remains constant as the door 102 opens and closes, $C_{total}$ changes as $C_2$ changes. Assuming that $C_1$ is relatively close to $C_2$ when the door is closed, then $C_{total}$ is approximately equal to $C_2/2$. When the door 102 is open and $C_2$ is approximately 0, $C_{total}$ is also approximately 0. Therefore, the changes in $C_2$ when the door 102 is in various states of openness is large enough to be used to determine the various states of the door 102.

In some implementations, the sensor 502 includes a non-conductive material that covers the conductive materials 504 and 505. The non-conductive material may be a dielectric material that affects the capacitance between the conductive material 504 and the conductive material 506. When the sensor 502 is attached to the door 102, the non-conductive material may prevent the conductive materials 504 and 505 and the conductive materials 506 and 507 from shorting.

The sensor 502 calculates changes in the capacitance by measuring changes in the voltage across the leads 122. In this particular configuration, the changes in voltage across the leads 122 provides the changes in voltage across the electrodes 124 and the conductive materials 504 and 505 and the conductive materials 506 and 507. The sensor 502 is able to detect a state of the door 102 based on differences between capacitances calculated across the conductive materials 504 and 505, and the conductive materials 506 and 507 in ways similar to those described above with respect to FIGS. 1-3 that involve the electrodes 124 and the other side of the hinge 116.

The capacitance attributed directly to the connection between the conductive materials 504 and 505 and the conductive materials 506 and 507 is a fixed capacitance because the distance between the conductive materials 504 and 505, and the conductive materials 506 and 507 is fixed. This fixed capacitance can be accounted for when determining a difference between calculations of capacitance across the conductive materials 504 and 505, and the conductive materials 506 and 507. For example, when installing the sensor 502 on the door 102, a technician or an end user can calibrate the capacitance measurement by inputting the capacitance calculated across the conductive materials 504 and 505, and the conductive materials 506 and 507 when the door 102 is closed and when the door 102 is fully open.

Using a capacitive connection between the sensor 502 and the electrodes 124 eliminates a point of failure and reduces potential costs associated with other solutions that reduce the possibility of disconnecting the sensor 502 from the rest of the system 500.

Figure 6:
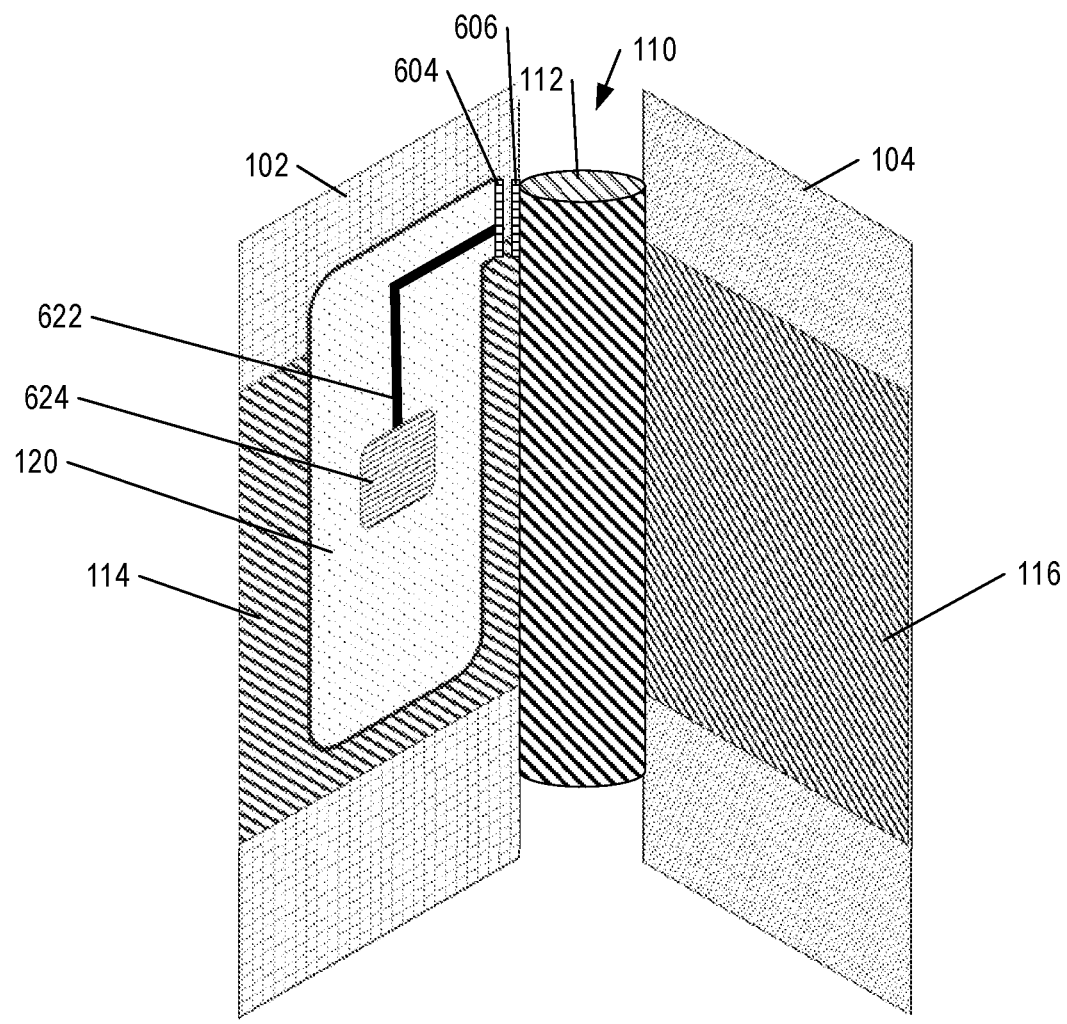
FIG. 6 illustrates an example setup of a capacitive sensing system for determining the state of a door.

FIG. 6 illustrates an example setup of a capacitive sensing system 600 for determining the state of a door. The system 600 is similar to the systems described above with respect to FIGS. 1-5, and like reference numbers indicate like components. The system 600 includes a lead 622 and an electrode 624.

The lead 622 is a connection that connects the electrode 624 to a sensor system, such as the capacitive sensors 202 or 502. In this particular configuration, the lead 622 connects the electrode 624 to the sensor 502 through the conductive material 506. The lead 622 can be any of various types of electrical connections, including wires, solder, printed circuit board (PCB) connections, etc. In some examples, the lead 622 connects the electrode 624 to various sensing or measurement systems. In such examples, the lead 622 may allow the sensor to apply a voltage across materials to which the lead 622 is connected, and may allow the sensor to measure a voltage of the capacitor when not applying a voltage to the capacitor.

The electrode 624 is a conductor. The electrode 624 may be connected to other systems, such as a sensing or measuring system by the lead 622. The electrode 624 may be constructed of any conducting material, including metals, electrolytes, superconductors, semiconductors, etc.

As shown in the system 600, there is a single electrode 624, in contrast to the two electrodes 124a and 124b as shown in FIGS. 1-2C and 5. In some examples, the electrode 624 is encased in the substrate 120, and the substrate 120 may be plastic, or made of various non-conducting materials. In some examples, the electrode 624 is not encased in the substrate 120, and may be placed on the substrate 120 or otherwise coupled to the substrate 120. In such examples, the electrode 624 is insulated by being placed in a non-conducting material. Any of the embodiments or configurations of the capacitive sensing system described in this document can operate with a single electrode as shown in the system 600.

The system 600 shows a single electrode design which creates an open circuit. Due to the open circuit design, a method of calculating capacitance can include measuring how an oscillator's resonating frequency is affected by the RC components of the system 600. The only varying quantity within such measurements is the voltage between the single electrode 624 and the other side of the hinge 116.

As described in FIGS. 1-3 and 5, the capacitance calculated based on the voltage between the electrodes 124, or in this example, calculated based on the voltage change measured using the single electrode 624, changes as the door 102 goes through various stages of being closed.

With the door 102 fully open, the capacitance calculated using the change in voltage measured using the electrode 624 can be negligible. For example, the capacitance calculated at the electrode 624 can be one picofarad, which may be negligible. When the door 102 is partially open, the capacitance calculated at the electrode 624 is greater than the capacitance calculated at the electrode 624 when the door is fully open. The capacitance calculated at the electrode 624 increases because the distance between the electrode 624 and the opposite side of the hinge 116 decreases from the door 102 being fully open. When the door 102 is closed, the capacitance at the electrode 624 is greater than the capacitance at the electrode 624 when the door is partially open.

Other arrangements and distribution of processing is possible and contemplated within the present disclosure.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed application-specific integrated circuits (ASICs).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

The invention claimed is:

1. A capacitive door sensor comprising:
   an insulating plate that is located on a first leaf of a hinge that includes the first leaf and a second leaf;
   a first conductive plate that is located on the insulating plate;
   a second conductive plate that is located on the insulating plate and that is separate and spaced apart from the first conductive plate; and
   a capacitance sensor that is electrically connected to the first conductive plate, that is electrically connected to the second conductive plate, and that is configured to detect a change in capacitance between the first conductive plate and the second conductive plate.

2. The capacitive door sensor of claim 1, wherein the first conductive plate and the second conductive plate are electrically isolated.

3. The capacitive door sensor of claim 1, wherein:
   the hinge is attached to a door, and
   the capacitance between the first conductive plate and the second conductive plate based on the door being closed is greater than the capacitance between the first conductive plate and the second conductive plate based on the door being open.

4. The capacitive door sensor of claim 3, wherein the first conductive plate and the second conductive plate are electrically isolated from the second leaf of the hinge based on the door being closed.

5. The capacitive door sensor of claim 1, wherein the first conductive plate and the second conductive plate are electrically isolated from the first leaf of the hinge.

6. The capacitive door sensor of claim 1, wherein:
   a capacitance between the first conductive plate and the first leaf of the hinge is constant, and
   a capacitance between the second conductive plate and the first leaf of the hinge is constant.

7. The capacitive door sensor of claim 1, wherein:
   the capacitance sensor includes:
      a third conductive plate and a fourth conductive plate that are in a first plane, and
      a fifth conductive plate and a sixth conductive plate that are in a second plane that is parallel to the first plane,
   the first conductive plate is electrically connected to the third conductive plate, and
   the second conductive plate is electrically connected to the fourth conductive plate.

8. The capacitive door sensor of claim 7, wherein the capacitance sensor is configured to detect a change in capacitance between the first conductive plate and the second conductive plate by detecting a change in capacitance between third conductive plate and the fifth conductive plate and a change in capacitance between the fourth conductive plate and the sixth conductive plate.

9. The capacitive door sensor of claim 7, wherein the third conductive plate, the fourth conductive plate, the fifth conductive plate, and the sixth conductive plate are electrically isolated.

10. The capacitive door sensor of claim 1, wherein the first conductive plate and the second conductive plate are located in a same plane.

11. The capacitive door sensor of claim 1, wherein the second leaf of the hinge is conductive.

12. A computer-implemented method comprising:
   generating, by a capacitive door sensor of a monitoring system that is configured to monitor a property, a varying electrical signal, wherein the capacitive door sensor includes a coplanar capacitor on a conductive door hinge;
   applying, by the capacitive door sensor of the monitoring system, the varying electrical signal to a circuit that includes the coplanar capacitor;
   during application of the varying electrical signal to the circuit that includes the coplanar capacitor, measuring, by the capacitive door sensor of the monitoring system, a voltage across the coplanar capacitor;
   based on the voltage across the coplanar capacitor and on the varying electrical signal, determining, by the capacitive door sensor of the monitoring system, a capacitance of the coplanar capacitor; and
   based on the capacitance of the coplanar capacitor, determining, by the monitoring system, whether a door of the property and that is attached to the conductive door hinge is open or closed.

13. The method of claim 12, comprising:
   comparing the capacitance of the coplanar capacitor to predetermined capacitance ranges; and
   based on comparing the capacitance of the coplanar capacitor to the predetermined capacitance ranges, determining that the capacitance of the coplanar capacitor is within a particular capacitance range of the predetermined capacitance ranges,
   wherein determining whether the door that is attached to the conductive door hinge is open or closed is based further on determining that the capacitance of the coplanar capacitor is within the particular capacitance range of the predetermined capacitance ranges.

14. The method of claim 12, wherein:
generating, by the capacitive door sensor that includes a coplanar capacitor on the conductive door hinge, the varying electrical signal comprises generating, by the capacitive door sensor that includes a coplanar capacitor on the conductive door hinge, the varying electrical signal for a predetermined period of time, and
determining a capacitance of the coplanar capacitor is based further on the predetermined period of time.

15. The method of claim 12, comprising:
comparing the capacitance of the coplanar capacitor to predetermined capacitance ranges that each correspond to an angle of openness of the door;
based on comparing the capacitance of the coplanar capacitor to the predetermined capacitance ranges, determining that the capacitance of the coplanar capacitor is within a particular capacitance range of the predetermined capacitance ranges, the particular capacitance range corresponding to a particular angle of openness of the door; and
based on determining that the capacitance of the coplanar capacitor is within the particular capacitance range that corresponds to a particular angle of openness of the door, determining that an angle of openness of the door is the particular angle of openness.

16. The method of claim 15, comprising:
based on determining that an angle of openness of the door is the particular angle of openness, performing, by the monitoring system that is connected to the capacitive door sensor, an action that corresponds to the angle of openness of the door.

17. The method of claim 12, wherein:
the circuit that includes the capacitive door sensor includes a resistor,
the method comprises:
  during application of the varying electrical signal to the circuit that includes the coplanar capacitor, measuring the voltage across the resistor, and
  determining the capacitance of the coplanar capacitor is based further on the voltage across the resistor.

18. The method of claim 12, wherein:
generating, by the capacitive door sensor that includes a coplanar capacitor on the conductive door hinge, the varying electrical signal comprises generating, by the capacitive door sensor that includes a coplanar capacitor on the conductive door hinge, the varying electrical signal for a predetermined period of time and a predetermined number of cycles,
measuring the voltage across the coplanar capacitor comprises determining a number of cycles of the voltage across the coplanar capacitor, and
determining the capacitance of the coplanar capacitor is based further on the number of cycles of the voltage across the coplanar capacitor, the predetermined period of time, and the predetermined number of cycles.

19. The method of claim 12, comprising:
comparing the capacitance of the coplanar capacitor to a predetermined capacitance; and
based on comparing the capacitance to the coplanar capacitor to the predetermined capacitance, determining that the capacitance of the coplanar capacitor is equal to the predetermined capacitance,
wherein determining whether the door that is attached to the conductive door hinge is open or closed comprises determining that the door that is attached to the conductive door hinge is open based on determining that the capacitance of the coplanar capacitor is equal to the predetermined capacitance.

20. The method of claim 12, comprising:
comparing the capacitance of the coplanar capacitor to a predetermined capacitance; and
based on comparing the capacitance to the coplanar capacitor to the predetermined capacitance, determining that the capacitance of the coplanar capacitor is not equal to the predetermined capacitance,
wherein determining whether the door that is attached to the conductive door hinge is open or closed comprises determining that the door that is attached to the conductive door hinge is closed based on determining that the capacitance of the coplanar capacitor is not equal to the predetermined capacitance.

* * * * *